United States Patent
Yasui et al.

(10) Patent No.: US 6,925,371 B2
(45) Date of Patent: Aug. 2, 2005

(54) VEHICLE MOTION CONTROL APPARATUS

(75) Inventors: Yoshiyuki Yasui, Nagoya (JP); Wataru Tanaka, Anjo (JP); Eiichi Ono, Toyota (JP); Yuji Muragishi, Nagoya (JP); Katsuhiro Asano, Toyoake (JP); Minekazu Momiyama, Chiryu (JP); Hiroaki Kato, Nukata-gun (JP); Kenji Asano, Toyota (JP); Yuzo Imoto, Chita-gun (JP)

(73) Assignees: Aisin Seiki Kabushiki Kaisha, Kariya (JP); Toyoda Koki Kabushiki Kaisha, Kariya (JP); Advics Co., Ltd., Kariya (JP)

( * ) Notice: Subject to any disclaimer, the term of this patent is extended or adjusted under 35 U.S.C. 154(b) by 59 days.

(21) Appl. No.: 10/420,832

(22) Filed: Apr. 23, 2003

(65) Prior Publication Data

US 2004/0016594 A1 Jan. 29, 2004

(30) Foreign Application Priority Data

Apr. 23, 2002 (JP) ........................ 2002-120565

(51) Int. Cl.⁷ .............................. B62D 6/00; B60T 8/58
(52) U.S. Cl. .............................. 701/72; 701/41; 701/78
(58) Field of Search .............................. 701/41, 42, 72, 701/80, 78, 48, 91, 83, 84, 85; 180/443, 446

(56) References Cited

U.S. PATENT DOCUMENTS

| | | | |
|---|---|---|---|
| 5,752,752 A | * 5/1998 | Tozu et al. | ............ 303/146 |
| 6,199,654 B1 | 3/2001 | Kojo et al. | |
| 6,349,789 B1 | 2/2002 | Nakano et al. | |
| 6,453,226 B1 | * 9/2002 | Hac et al. | ............ 701/48 |
| 6,591,937 B2 | * 7/2003 | Badenoch et al. | ........ 180/446 |
| 6,604,036 B2 | * 8/2003 | Pallot | ............ 701/48 |
| 6,697,728 B2 | * 2/2004 | Kin et al. | ............ 701/70 |
| 2001/0003810 A1 | 6/2001 | Shinmura et al. | |
| 2002/0011093 A1 | 1/2002 | Matsuno | |
| 2003/0213640 A1 | 11/2003 | Kato et al. | |

FOREIGN PATENT DOCUMENTS

| | | |
|---|---|---|
| EP | 0 716 948 A2 | 6/1996 |
| JP | 62-146754 A | 6/1987 |
| JP | 2-70561 A | 3/1990 |
| JP | 2-106468 A | 4/1990 |
| JP | 11-49003 A | 2/1999 |
| JP | 11-99956 A | 4/1999 |
| WO | WO 90/14980 | * 12/1990 |

OTHER PUBLICATIONS

*Automotive Engineering Handbook*, First Volume, *Basic & Theory*, Feb. 1, 1990, Society of Automotive Engineers of Japan, Inc., pp. 179–180.

* cited by examiner

*Primary Examiner*—Michael J. Zanelli
(74) *Attorney, Agent, or Firm*—Burns, Doane, Swecker & Mathis, L.L.P.

(57) ABSTRACT

The present invention is directed to a vehicle motion control apparatus, which includes a steering factor detection unit for detecting at least one of steering factors including a steering torque and steering effort applied to a steering system, an aligning torque estimation unit for estimating an aligning torque produced on at least a wheel of the vehicle on the basis of the steering factor, a vehicle state variable detection unit for detecting a state variable of the vehicle, a wheel factor estimation unit for estimating at least one of wheel factors including a side force and slip angle applied to the wheel on the basis of the vehicle state variable, and a grip factor estimation unit for estimating a grip factor of at least a tire of the wheel, in accordance with the estimated alignment torque and the estimated wheel factor. The apparatus further includes a first control unit for performing a closed loop control on the basis of the grip factor, and a second control unit for performing a closed loop control on the basis of a deviation between a detected actual vehicle behavior and a desired vehicle behavior set on the basis of the vehicle state variable.

15 Claims, 29 Drawing Sheets

VEHICLE MOTION CONTROL APPARATUS

This application claims priority under 35 U.S.C. Sec. 119 to No. 2002-120565 filed in Japan on Apr. 23, 2002, the entire content of which is herein incorporated by reference.

BACKGROUND OF THE INVENTION

1. Field of the Invention

The present invention relates to a vehicle motion control apparatus, particularly relates to an apparatus for performing at least one of controls including a steering control, braking force control and throttle control, to maintain a vehicle stability.

2. Description of the Related Arts

In order to maintain a stability of a vehicle, there is known heretofore an apparatus for setting a desired vehicle behavior, comparing the same with an actual vehicle behavior to provide a deviation between them, and controlling a braking force or steering angle on the basis of the deviation, as disclosed in Japanese Patent Laid-open Publication Nos. 2-70561 and 2-106468, for example. And, there is disclosed in Japanese Patent Laid-open Publication No. 62-146754, an apparatus for setting a front wheel speed difference and a target value of lateral acceleration or yaw rate, on the basis of a steering angle and vehicle speed, to control brake and/or engine outputs.

In any of the Publications as described above, the apparatuses relate to a closed loop control of vehicle behavior, and operate in a vehicle limit zone. In order to improve a vehicle stability in motion, therefore, an operation zone for vehicle stability control is required to extend to a normal operation zone. According to the apparatuses, however, the vehicle stability control is performed on the basis of the vehicle behavior as a state variable of the vehicle. As a result, there is a limit to a control zone, which is to be extended to the normal operation zone.

The above-described subject matter regarding the operation zone and control zone will be explained hereinafter, referring to FIG. 2 schematically showing a characteristic of side force applied to a tire. The side force to the tire (wheel) is increased linearly, with a wheel slip angle increased, and saturated at a limit of coefficient of friction against a road. For example, when the road coefficient of friction $\mu$ is high, the side force characteristic is the one as indicated by 0-S-T in FIG. 2. If the road coefficient of friction $\mu$ is decreased, the characteristic will be the one as indicated by 0-Q-R in FIG. 2. As the state variable indicative of the vehicle behavior, such as lateral acceleration or yaw rate, directly reflects the side force characteristic of the tire, the characteristic of the state variable will be similar to the one as shown in FIG. 2.

According to the closed loop control of the vehicle behavior, the limit of coefficient of friction can be determined on the basis of the vehicle behavior in the limit zone, such as a point (X) in FIG. 2. However, if the vehicle is in such a state as indicated by a point (Y), it is impossible to determine whether the point (Y) is on the side force characteristic of 0-S-T (i.e., high-$\mu$ characteristic), or on the side force characteristic of 0-Q-R (i.e., low-$\mu$ characteristic), as shown in FIG. 2. In other words, by means of only the state variable indicative of the vehicle behavior, it is impossible to determine whether there would be a margin to the limit of the coefficient of friction against the road surface, or the vehicle could be approaching an unstable zone.

SUMMARY OF THE INVENTION

Accordingly, it is an object of the present invention to provide a vehicle motion control apparatus capable of beginning a stability control of a vehicle in a normal operation zone well before the wheel reaches a friction limit zone, by means of a grip factor indicative of a grip level of tire in a lateral direction to a steered wheel, e.g., front wheel.

In accomplishing the above object, the vehicle motion control apparatus includes steering factor detection means for detecting at least one of steering factors including a steering torque and steering effort applied to a steering system extending from a steering wheel to a suspension of a vehicle, aligning torque estimation means for estimating an aligning torque produced on at least a wheel of the vehicle on the basis of the steering factor detected by the steering factor detection means, vehicle state variable detection means for detecting a state variable of the vehicle, wheel factor estimation means for estimating at least one of wheel factors including a side force and slip angle applied to the wheel on the basis of the state variable detected by the vehicle state variable detection means, and grip factor estimation means for estimating a grip factor of at least a tire of the wheel, in accordance with a relationship between the alignment torque estimated by the aligning torque estimation means and the wheel factor estimated by the wheel factor estimation means. The apparatus further includes first control means for performing a closed loop control on the basis of the grip factor estimated by the grip factor estimation means, and second control means having desired vehicle behavior setting means for setting a desired vehicle behavior on the basis of the state variable detected by the vehicle state variable detection means, and actual vehicle behavior detection means for detecting an actual vehicle behavior of the vehicle. The second control means is adapted to perform a closed loop control on the basis of a deviation between the actual vehicle behavior detected by the actual vehicle behavior detection means and the desired vehicle behavior set by the desired vehicle behavior setting means.

For example, on the basis of the steering torque applied to a steering wheel or steering effort applied to a suspension, the aligning torque produced on a front wheel (or front wheels) is estimated. And, on the basis of the vehicle state variable, the side force or slip angle of the front wheel is estimated. Then, the grip factor of the front wheel can be estimated, on the basis of the variation of the aligning torque against the side force or slip angle of the front wheel. The state variable includes various factors such as vehicle speed, lateral acceleration, yaw rate, steered wheel angle, amount of operation of the vehicle driver like a steering operation angle, and factors indicative of the vehicle in motion.

The apparatus may further include priority means which is provided for determining first conditions for performing the closed loop control by the first control means and second conditions for performing the closed loop control by the second control means, and which is provided for giving priority to the second control means when the first conditions and the second conditions have been fulfilled simultaneously.

In the apparatus as described above, the first control means is preferably adapted to perform at least one of controls including a steering control for controlling a steering gear ratio of a steering operation angle to a steered wheel angle, a braking force control for increasing a braking force applied to at least one wheel of the vehicle, and a throttle control for restricting a throttle opening of an engine installed on the vehicle.

The first control means may be adapted to perform a closed loop steering control on the basis of the grip factor estimated by the grip factor estimation means, and the second control means may be adapted to perform a closed loop steering control on the basis of the state variable detected by the vehicle state variable detection means.

Or, the first control means may be adapted to control a steering gear ratio of a steering operation angle and a steered wheel angle on the basis of the grip factor estimated by the grip factor estimation means, and the second control means may be adapted to control the steered wheel angle independently and irrespective of the steering operation angle.

Furthermore, the first control means may be adapted to perform a closed loop braking force control on the basis of the grip factor estimated by the grip factor estimation means, and the second control means may be adapted to perform a closed loop braking force control on the basis of the state variable detected by the vehicle state variable detection means.

In the apparatus as described above, the first control means may be adapted to perform the braking force control on the basis of the grip factor, only by increasing the braking force applied to at least one wheel of the vehicle, and the second control means may be adapted to control a yaw moment acting on the vehicle by increasing or decreasing the braking force applied to at least one wheel of the vehicle.

The vehicle motion control may include control means for controlling a steering gear ratio of a steering operation angle to a steered wheel angle, and controlling the braking force applied to at least one wheel of the vehicle to reduce a speed of the vehicle, on the basis of the grip factor estimated by the grip factor estimation means, respectively.

Preferably, the apparatus may further include reference aligning torque setting means for setting a reference aligning torque on the basis of the wheel factor estimated by the wheel factor estimation means and the aligning torque estimated by the aligning torque estimation means. And, the grip factor estimation means is adapted to estimate the grip factor of the tire on the basis of a result of comparison between the aligning torque estimated by the aligning torque estimation means and the reference aligning torque set by the reference aligning torque setting means.

In the apparatus, the reference aligning torque setting means may be adapted to set the reference aligning torque by approximating a characteristic of the aligning torque estimated by the aligning torque estimation means against the wheel factor estimated by the wheel factor estimation means to a linear characteristic of the reference aligning torque including at least the origin, and adapted to set the reference aligning torque on the basis of the linear characteristic of the reference aligning torque.

Or, the reference aligning torque setting means may be adapted to set a linear characteristic of the reference aligning torque with a gradient which is provided by a brush model of the wheel for estimating the grip factor on the basis of a margin of side force for road friction, and adapted to set the reference aligning torque on the basis of the linear characteristic of the reference aligning torque.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
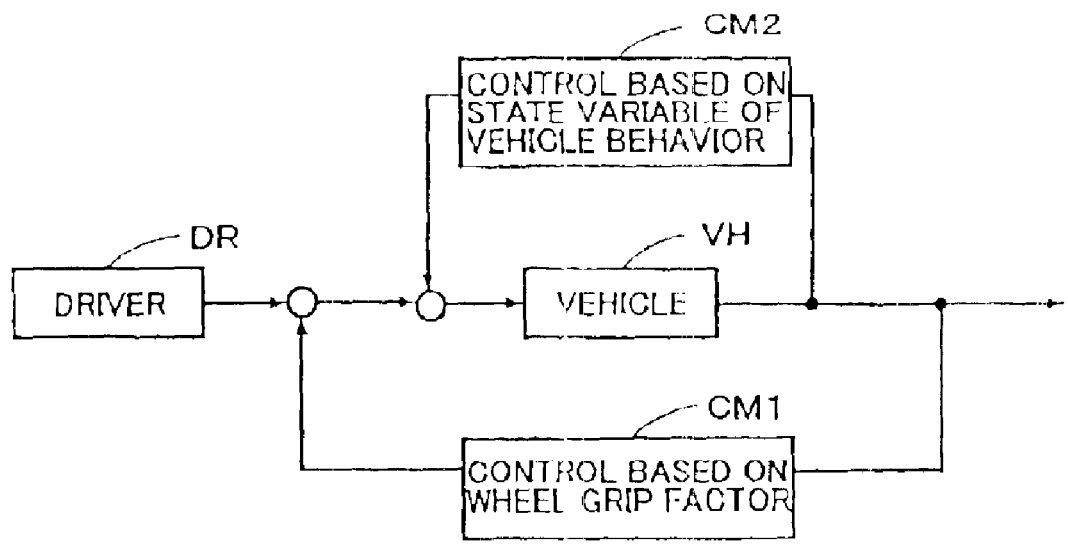
FIG. 1 is a schematic block diagram showing a basic constitution of a vehicle motion control apparatus according to the present invention.
Figure 2:
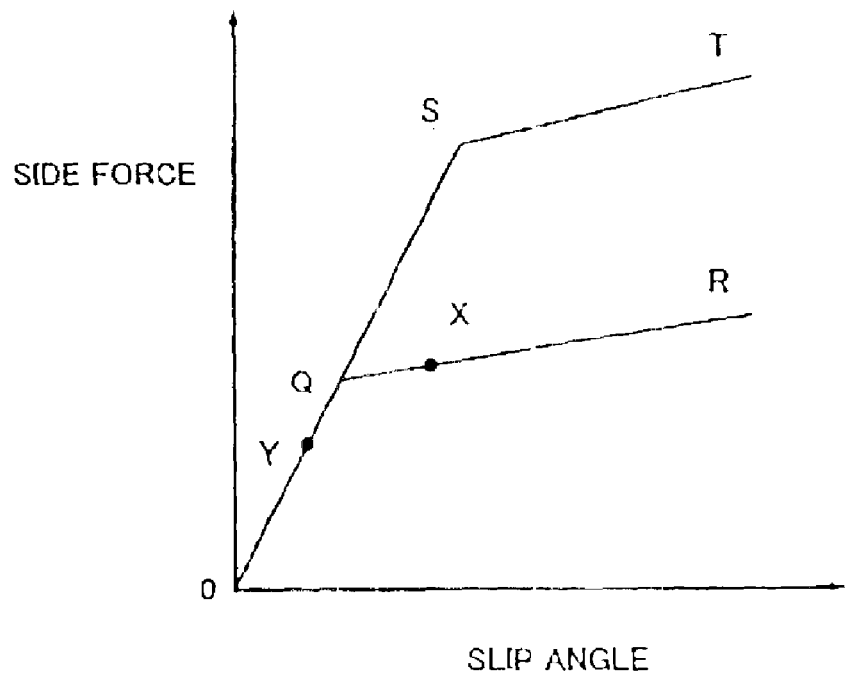
FIG. 2 is a diagram schematically showing a characteristic of side force of a tire according to an ordinary vehicle.

Referring to FIG. 1, there is schematically illustrated a block diagram of a vehicle motion control apparatus according to the present invention. The apparatus includes a first control unit CM1 for performing a closed loop control (hereinafter, referred to as a grip factor control) on the basis of a grip factor of a wheel, which will be described later in detail, and a second control unit CM2 for performing a closed loop control (hereinafter, referred to as a vehicle behavior control) on the basis of a state variable of a vehicle VH, such as a lateral acceleration, yaw rate, vehicle slip angle, vehicle slip angular velocity and the like. Accordingly, mainly in a normal operation zone, in the case where the wheel grip factor is getting reduced to approach a friction limit zone, the grip factor control is performed by the first control unit CM1 for at-least one of operations of a vehicle driver DR including a braking operation, steering operation and accelerating operation, to maintain the vehicle stability. Furthermore, in the case where the vehicle has come into the friction limit zone even if the grip factor control was executed, the vehicle behavior control is performed by the second control unit CM2, to maintain the vehicle stability.

According to the grip factor control, at least one of the following controls is performed. At the outset, the steering control is provided for controlling a steering gear ratio of a steering operation angle (i.e., steering handle angle) to a steered wheel angle, to prevent the grip factor from being reduced, thereby to restrict the steering operation. Next, the braking force control is provided for increasing a braking force applied to at least one wheel of the vehicle, to restore the grip factor, thereby to reduce the vehicle speed. And, the throttle control is provided for restricting a throttle opening of an engine, to prevent the grip factor from being reduced in response to acceleration, thereby to restrict an accelerating operation eventually.

In contrast, the vehicle behavior control is performed on the basis of the vehicle variable to maintain the vehicle stability. According to the vehicle behavior control, a desired vehicle behavior is set on the basis of the operation of the vehicle driver and vehicle speed, and on the basis of a deviation between the desired vehicle behavior and an actual vehicle behavior, at least one of the following controls is performed. At the outset, another braking force control is provided for controlling the yaw moment on the basis of a difference between the braking force applied to a left wheel and the same applied to a right wheel, to restrict the under steering or over steering, and reducing the vehicle speed. Next, another steering control is provided for controlling the wheel angle to restrict the under steering or over steering. And, another throttle control is provided for restricting the throttle opening of the engine, to prevent the under steering or over steering from being increased in response to accelerating operation. Among those controls, the braking force control is essential for the vehicle behavior control, because a controllable amount of the yaw moment is large according to the braking force control, so that it is most effective for maintaining the vehicle attitude.

In the case where conditions for performing the grip factor control and conditions for performing the vehicle behavior control are fulfilled simultaneously, the vehicle behavior control is given priority, as will be described later in detail.

Figure 3:
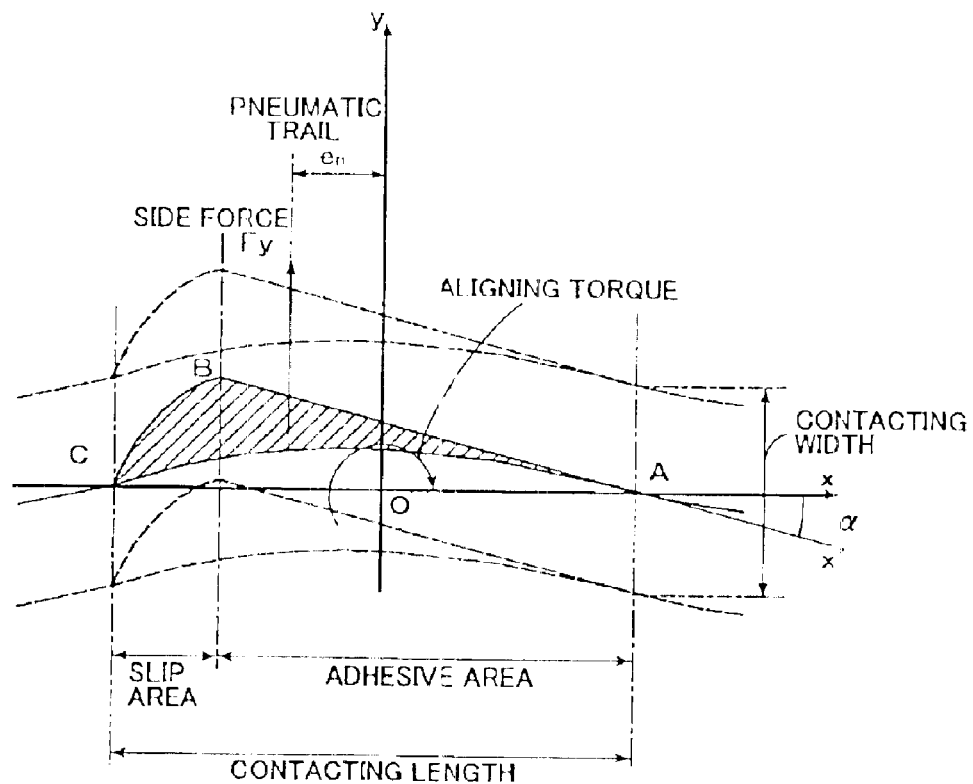
FIG. 3 is a diagram showing a relationship between aligning torque and side force, when a tire is advanced, skidding in a lateral direction.
Figure 4:
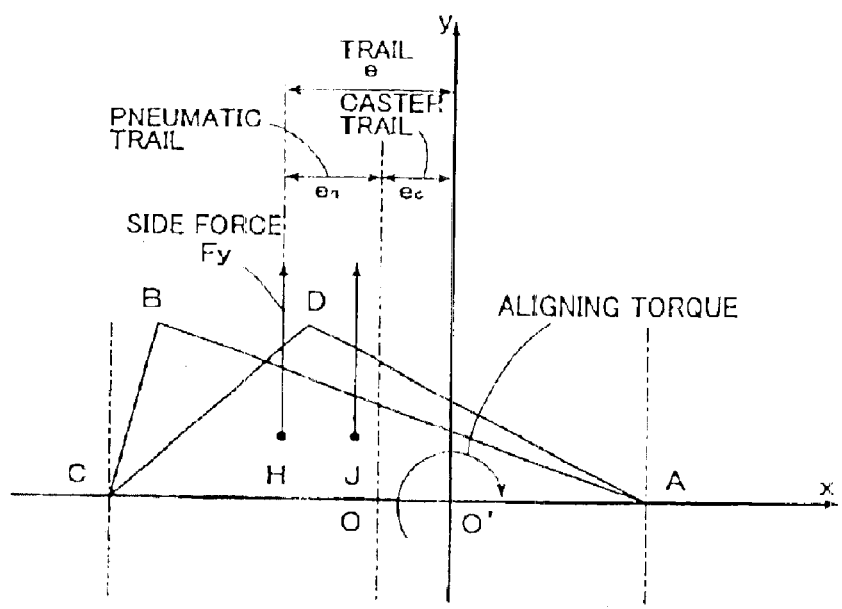
FIG. 4 is a diagram simplifying the relationship between aligning torque and side force as shown in FIG. 3.
Figure 5:
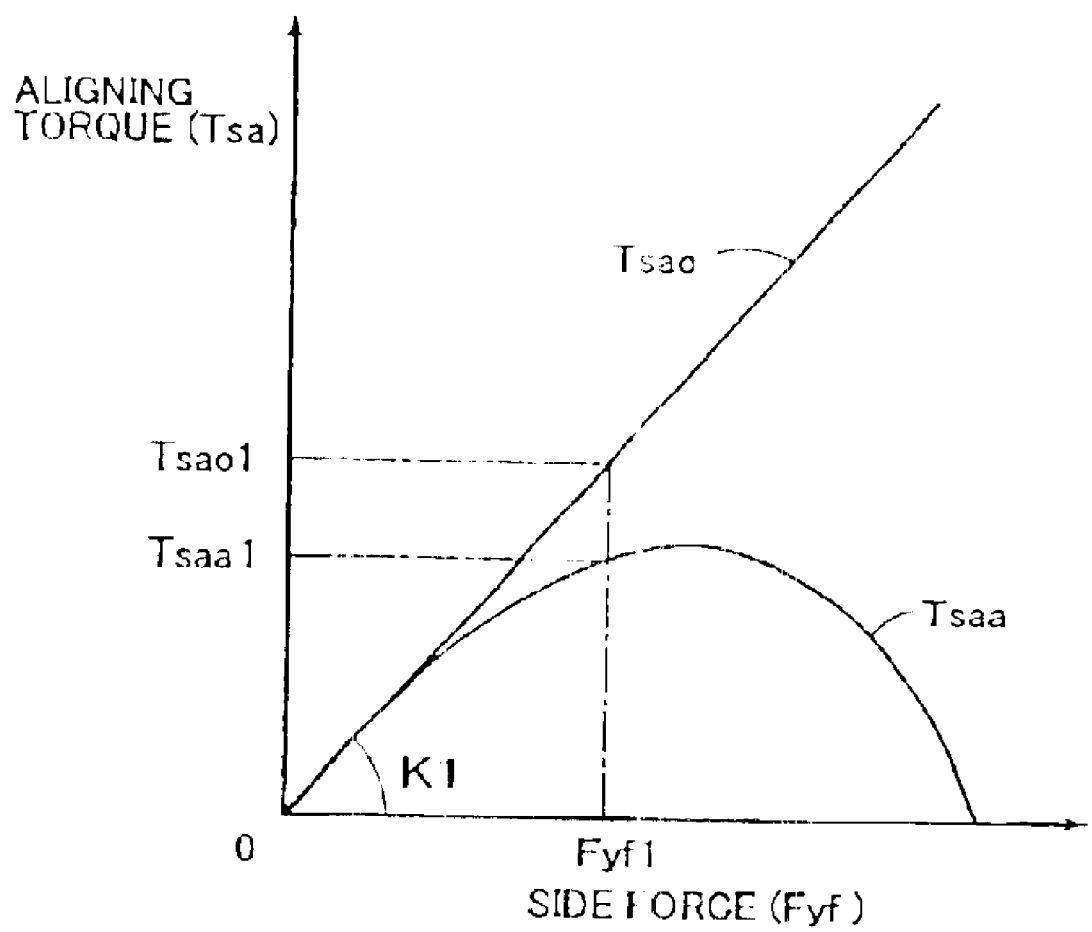
FIG. 5 is a diagram showing a relationship between aligning torque and side force according to an embodiment of the present invention.

Referring to FIGS. 3–5, an embodiment of estimating the grip factor will be explained hereinafter. At the outset, it is disclosed in AUTOMOTIVE ENGINEERING HANDBOOK, First Volume, for BASIC & THEORY, issued on Feb. 1st, 1990 by Society of Automotive Engineers of Japan, Inc., Pages 179 and 180, such a state that a tire rotates on a road, skidding at a slip angle $\alpha$, as shown in a part of FIG. 3 of the present application. As indicated by broken lines in FIG. 3, a tread surface of the tire contacts a road surface at a front end of the contacting surface including Point (A) in FIG. 3, and moves with the tire advanced, being adhesive to the road surface up to Point (B). The tire begins to slip when a deformation force by a lateral shearing deformation has become equal to a friction force, and departs from the road surface at a rear end including Point (C). In this case, a side force Fy produced on the overall contacting surface equals to a product of a deformed area of the tread in its lateral direction (as indicated by a hutching area in FIG. 3) multiplied by its lateral elastic coefficient per unit area. As shown in FIG. 3, a point of application of force for the side force Fy is shifted rearward (leftward in FIG. 3) from a point (O) on the center line of the tire, by a distance ($e_n$) which is called as a pneumatic trail. Accordingly, a moment Fy·$e_n$ becomes an aligning torque (Tsa), which acts in such a direction to reduce the slip angle α, and which may be called as a self-aligning torque.

Next will be explained the case where the tire is installed on a vehicle, with reference to FIG. 4 which simplified FIG. 3. With respect to steered wheels of a vehicle, in general, a caster angle is provided so that a steering wheel can be returned to its original position smoothly, to produce a caster trail ($e_c$). Therefore, the tire contacts the road surface at a point (O'), so that the moment for forcing the steering wheel to be positioned on its original position becomes Fy·($e_n+e_c$). When a lateral grip force of the tire is reduced to enlarge the slip area, the lateral deformation of the tread will result in changing a shape of ABC in FIG. 4 into a shape of ADC. As a result, the point of application of force for the side force Fy will be shifted forward in the advancing direction of the vehicle, from Point (H) to Point (J). That is, the pneumatic trail ($e_n$) will be reduced. Therefore, even in the case where the same side force Fy acts on the tire, if the adhesive area is relatively large and the slip area is relatively small, i.e., the lateral grip force of the tire is relatively large, the pneumatic trail ($e_n$) will be relatively large, so that the aligning torque Tsa will be relatively large. On the contrary, if the lateral grip force of the tire is lessened, and the slip area is enlarged, then the pneumatic trail ($e_n$) will become relatively small, so that the aligning torque Tsa will be reduced.

As described above, by monitoring the variation of the pneumatic trail ($e_n$), the grip level of the tire in its lateral direction can be detected. And, the variation of the pneumatic trail ($e_n$) results in the aligning torque Tsa, on the basis of which can be estimated a grip factor indicative of a grip level of the tire in its lateral direction, with respect to a front wheel for example (hereinafter simply referred to as grip factor). With respect to the grip factor, it can be estimated on the basis of a margin of side force for road friction, as described later in detail.

In this respect, the grip factor is clearly distinguished from a side force utilization ratio, or lateral G utilization ratio as described in the Japanese Publication No. 11-99956, wherein the maximal side force which can be produced on the road surface is obtained on the basis of the road coefficient of friction μ. And, this road coefficient of friction μ is estimated on the basis of a reliability of the cornering power Cp (value of the side force per the slip angle of one degree) on the road coefficient of friction μ. However, the cornering power Cp relies not only on the road coefficient of friction μ, but also a shape of the area of the road contacting the tire (its contacting length and width to the road), and elasticity of the tread rubber. For example, in the case where water exists on the tread surface, or the case where the elasticity of the tread rubber has been changed due to wear of the tire or its temperature change, the cornering power Cp will vary, even if the road coefficient of friction μ is constant. In the Japanese Publication No. 11-99956, therefore, nothing has been considered about the characteristic of the tire which constitutes the wheel.

As explained heretofore referring to FIGS. 3 and 4, the characteristic of the aligning torque to the side force of the front wheel will be the one as indicated by Tsaa in FIG. 5. In this case, when the actual aligning torque is indicated by Tsaa and the side force of the front wheel is indicated by Fyf, the actual aligning torque Tsaa can be given by Tsaa=Fyf·($e_n+e_c$), wherein a nonlinear characteristic of the actual aligning torque Tsaa to the front side force Fyf indicates a linear variation of the pneumatic trail $e_n$. Therefore, a gradient K1 of the actual aligning torque Tsaa to the front side force Fyf is identified in the vicinity of the origin (0), to obtain a characteristic as indicated by the aligning torque characteristic in the state that the tire is completely gripped, i.e., reference aligning torque Tsao. As for the gradient K1, may be employed a predetermined value which is obtained by an experiment as an initial value, and may be identified to be corrected during a normal operation operation of the vehicle, where the grip factor is large. The actual aligning torque Tsaa can be obtained in accordance with a calculation as described later in detail.

Then, the grip factor ε is estimated in accordance with the relationship of the actual aligning torque Tsaa to the reference aligning torque Tsao. For example, on the basis of the value Toast (=K1·Fyf1) of the reference aligning torque Tsao and the value Tsaa1 of the actual aligning torque Tsaa, which are obtained when the side force of the front wheel is Fyf1, the grip factor ε can be obtained by ε=Tsaa1/Tsao1.

Figure 6:
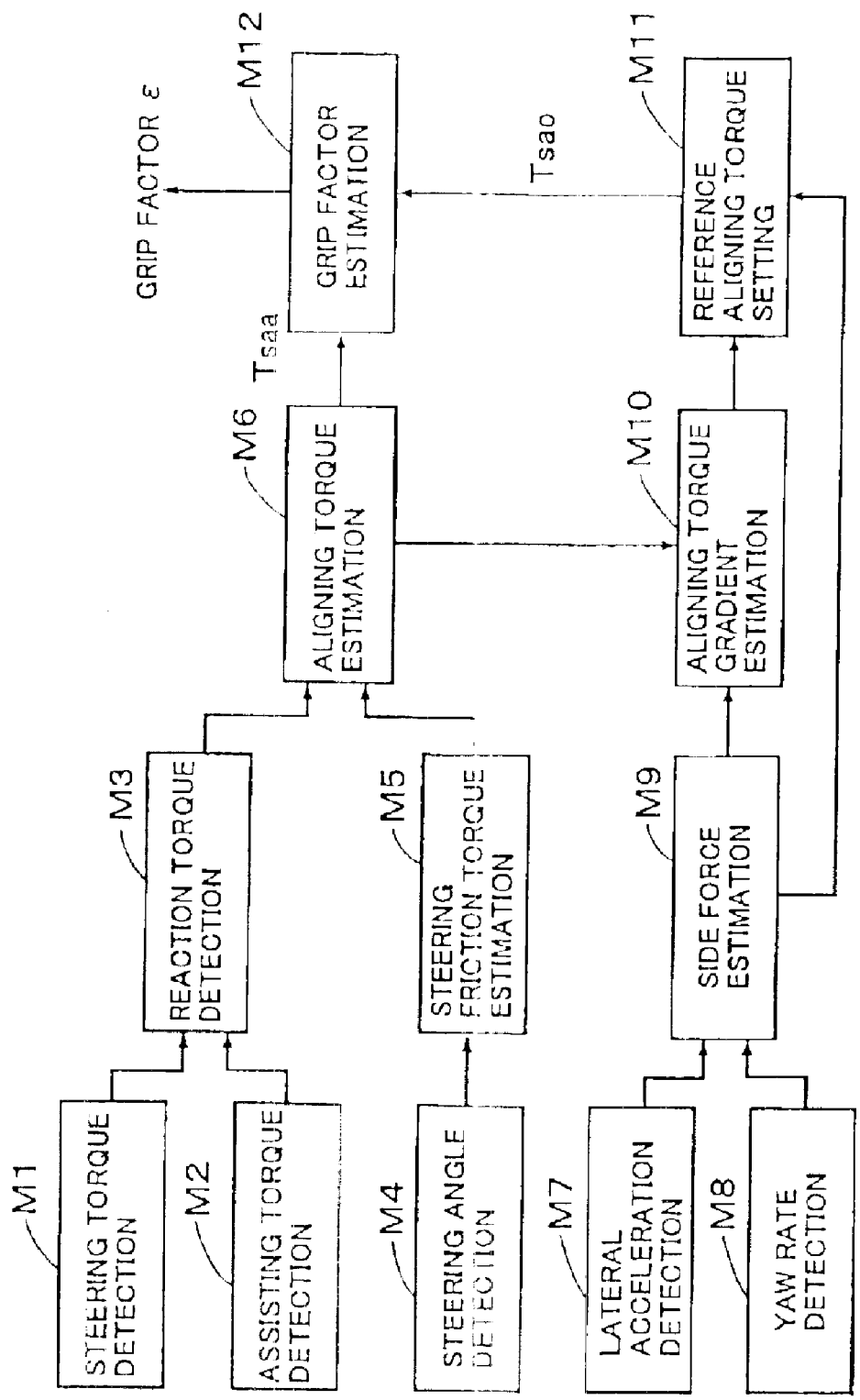
FIG. 6 is a block diagram showing a grip factor estimation in an embodiment of the present invention.
Figure 13:
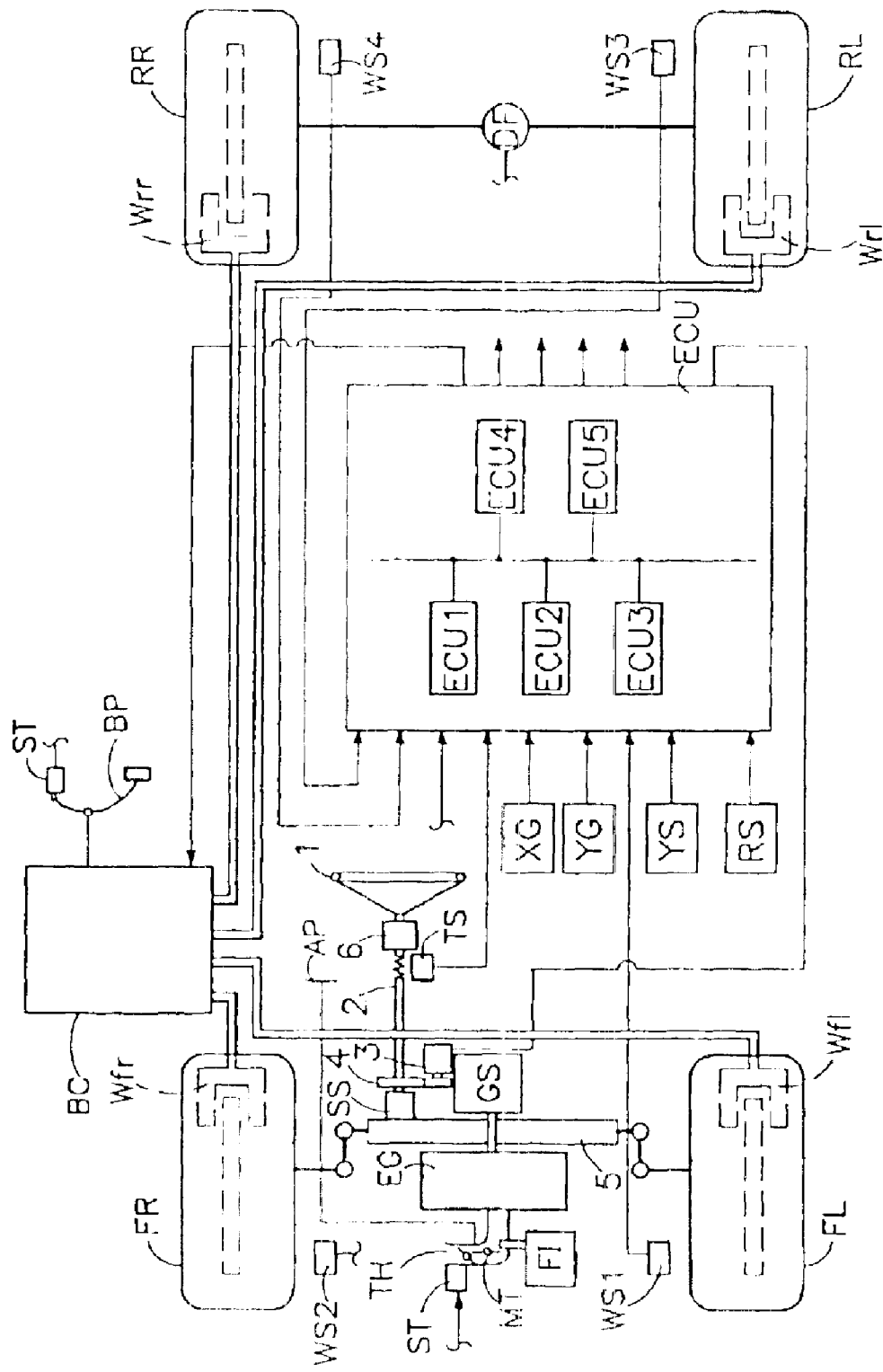
FIG. 13 is a block diagram of a vehicle motion control apparatus according to an embodiment of the present invention.
Figure 14:
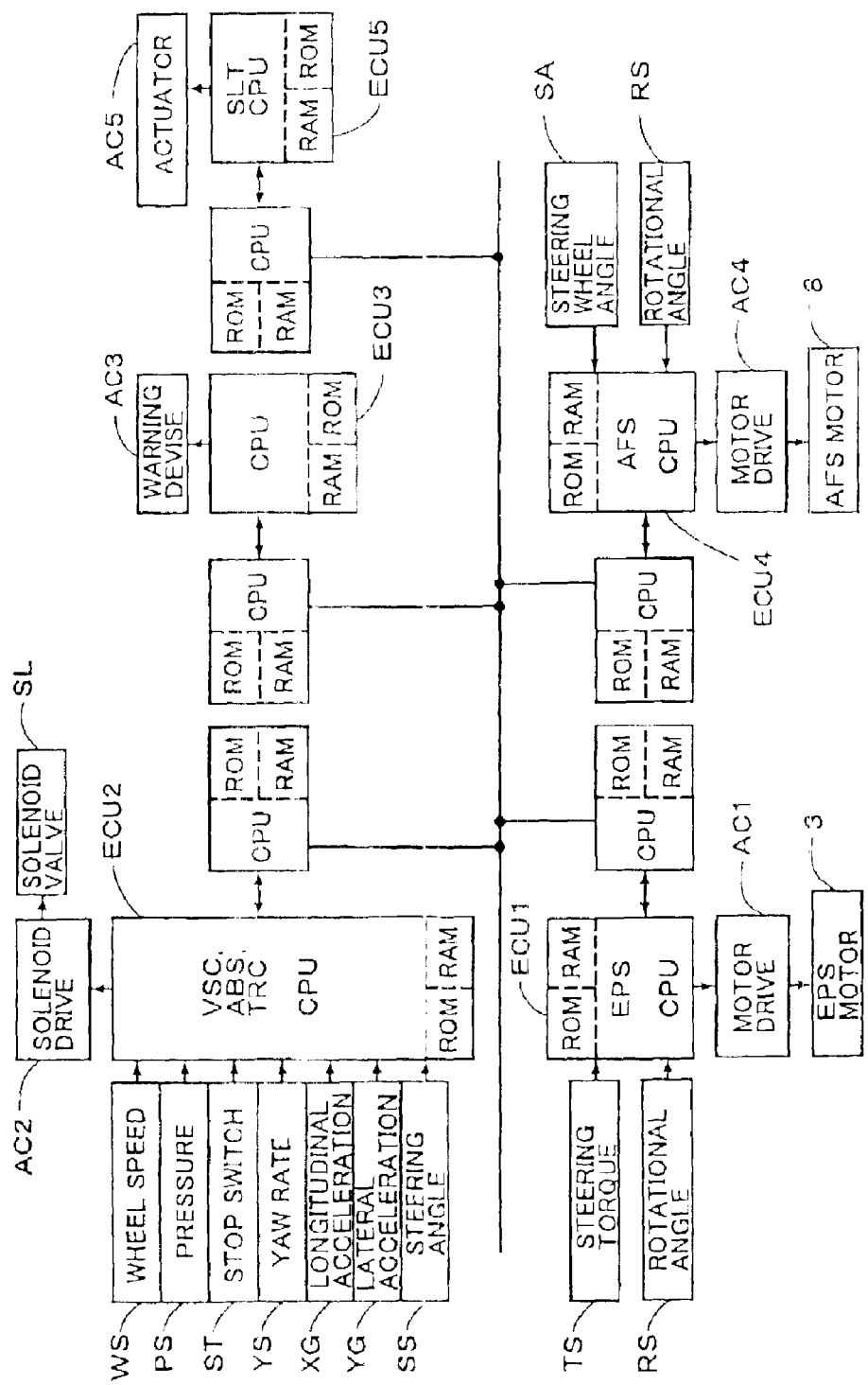
FIG. 14 is a block diagram showing systems of a motion control apparatus according to an embodiment of the present invention.
Figure 15:
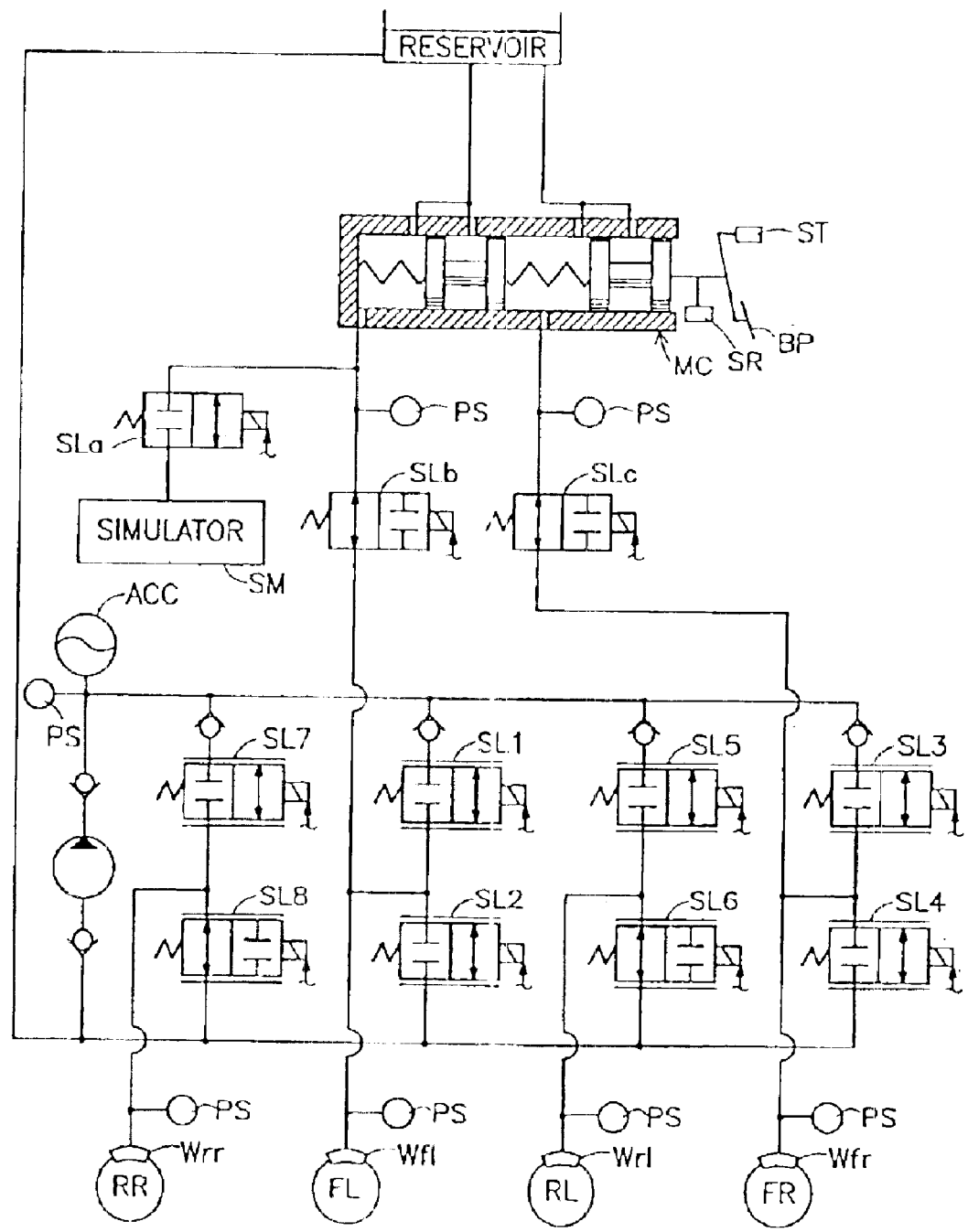
FIG. 15 is a block diagram illustrating a hydraulic braking apparatus according to an embodiment of the present invention.

As described above, the wheel grip factor can be estimated by the variation of the aligning torque (actual aligning torque Tsaa) to the side force (front side force Fyf), according to an apparatus as constituted in FIG. 6, which may be constituted practically as shown in FIGS. 13–15. Referring to FIG. 6, at the outset, as a steering factor detection unit for detecting at least one of steering factors including a steering torque and steering effort applied to a steering system extending from a steering wheel (not shown) to a suspension (not shown) of the vehicle, there are provided a steering torque detection unit M1 and an assisting torque detection unit M2. On the basis of the results detected by those units M1 and M2, a reaction torque is estimated by a reaction torque estimation unit M3.

In the present embodiment, an electric power steering apparatus EPS is provided, as shown in FIG. 13. According to the electric power steering apparatus EPS of the present embodiment, a steering torque Tstr which is applied to a steering shaft 2 with a steering wheel 1 operated by a vehicle driver, is detected by a steering torque sensor TS, and an electric motor 3 is controlled in response to the detected steering torque Tstr, to steer front wheels FL and FR through a speed reducing gear 4, and rack and pinion 5, so as to assist the steering operation of the vehicle driver. The steering angle is detected by a steering angle sensor SS as shown in FIG. 13 which serves as a steering angle detection unit M4. Then, a steering friction torque is estimated by a steering friction torque estimation unit M5, as described later in detail.

On the basis of the results of the reaction torque estimation unit M3 and friction torque estimation unit M5, therefore, the actual aligning torque Tsaa produced on the front wheels FL, FR is estimated by an aligning torque estimation unit M6. With respect to the vehicle state variable detection means for detecting a state variable of the vehicle, a lateral acceleration detection unit M7 and a yaw rate detection unit M8 are provided in the present embodiment. On the basis of the signals detected by the units M7 and M8, at least one of the wheel factors including the side force and slip angle applied to the front wheels FL and FR, e.g., the front side force Fyf as shown in FIG. 6, is estimated by a side force estimation unit M9 which serves as the wheel factor estimation means. The front side force Fyf can be estimated on the basis of the results detected by the lateral acceleration detection unit M7 and yaw rate detection unit M8, in accordance with the following equation:

$$Fyf = \frac{Lr \cdot m \cdot Gy + Iz \cdot \frac{d\gamma}{dt}}{L}$$

where "Lr" is a distance from the gravity center to the rear axle, "m" is a vehicle mass, "L" is a wheelbase, "Iz" is a yaw moment of inertia, "Gy" is a lateral acceleration, and "d$\gamma$/dt" is a differentiated value of yaw rate.

Furthermore, a reference aligning torque is set by a reference aligning torque setting unit M11, on the basis of the actual aligning torque Tsaa estimated by the aligning torque estimation unit M6 and the front side force Fyf estimated by the side force estimation unit M9. For example, a gradient of the aligning torque in the vicinity of the origin (abbreviated as origin gradient) is estimated by an aligning torque gradient estimation unit M10. On the basis of the origin gradient and front side force, the reference aligning torque is set by the reference aligning torque setting unit M11. Then, on the basis of a comparison result between the reference aligning torque set by the reference aligning torque setting unit M11 and the aligning torque estimated by the aligning torque estimation unit M6, the grip factor $\epsilon$ for the front wheel(s) is estimated by a grip factor estimation unit M12. As shown in FIG. 6, on the basis of the actual aligning torque Tsaa estimated by the aligning torque estimation unit M6 and the front side force Fyf estimated by the side force estimation unit M9, the gradient K1 of the actual aligning torque Tsaa in the vicinity of the origin (0) in FIG. 5 can be obtained. Based on the gradient K1 and the front side force Fyf, the reference aligning torque Tsao can be given by Tsao=K1·Fyf, and compared with the the actual aligning torque Tsaa. Then, based on the result of the comparison, the grip factor $\epsilon$ can be obtained by $\epsilon$=Tsaa/Tsao.

As described above, the electric power steering apparatus EPS is provided in the present embodiment, and an electric current for driving the apparatus EPS is proportional to the assisting torque. Therefore, the reaction torque can be estimated easily on the basis of the assisting torque and the result detected by the steering torque detection unit M1, as will be explained later in detail. Also, a torque caused by friction in the steering system is to be compensated. According to the steering friction torque estimation unit M5, therefore, calculated is a difference between the maximal reaction torque obtained when the steering wheel is rotated to increase the steering angle and the reaction torque obtained when the steering wheel is rotated to be placed in its original position, to provide the friction torque, which will be corrected in sequence. Consequently, the aligning torque (actual aligning torque Tsaa) can be estimated appropriately. With respect to detection of the aligning torque, the present invention is not limited to the above-described apparatus. For example, the aligning torque can be measured directly by signals detected by a load cell mounted on a steering shaft (not shown), or a strain gauge mounted on a suspension member (not shown).

Figure 7:
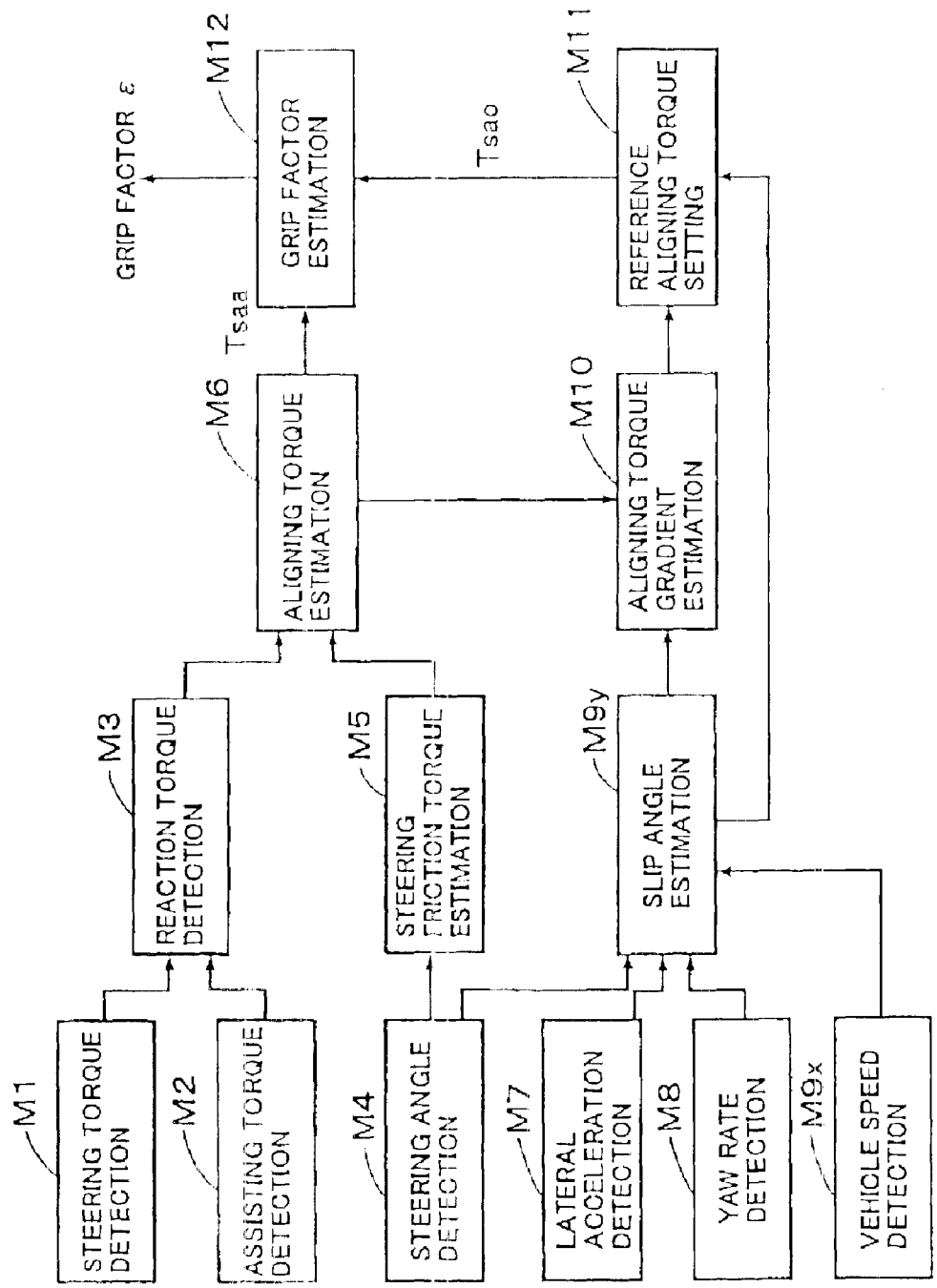
FIG. 7 is a block diagram showing a grip factor estimation in another embodiment of the present invention.

Next, referring to FIGS. 7–12, will be explained another embodiment of the wheel grip factor estimation according to the present invention. FIG. 7 shows a block diagram of a device for estimating the grip factor on the basis of the slip angle and aligning torque, wherein the blocks M1–M6 are the same as those shown in FIG. 6, so that the reaction torque and the friction torque in the steering system are calculated to estimate the aligning torque. Whereas, the slip angle can be calculated on the basis of the steering angle, yaw rate, lateral acceleration, and vehicle speed. Therefore, the signals detected by the steering angle detection unit M4, lateral acceleration detection unit M7 and yaw rate detection unit M8 are fed to a slip angle estimation unit M9y, together with a signal detected by a vehicle speed detection unit M9x. According to the slip angle estimation unit M9y, at the outset, a vehicle slip angular velocity d$\beta$/dt is calculated on the basis of the yaw rate, lateral acceleration and vehicle speed, and then integrated to produce a vehicle slip angle $\beta$. The slip angle, in particular, the wheel slip angle of the front wheel(s) which serves as the steered wheel (hereinafter, referred to as front wheel slip angle) $\alpha$f is calculated on the basis of the vehicle slip angle $\beta$, together with the vehicle speed, steering angle and vehicle specifications. The vehicle slip angle $\beta$ may be obtained by estimation using a vehicle model, or combination of this estimation and the integration as described above.

Based upon the aligning torque and slip angle $\alpha$f, the gradient of the aligning torque in the vicinity of the origin is identified by the aligning torque gradient estimation unit M10, then on the basis of the gradient and slip angle, the reference aligning torque is set by the reference aligning torque setting unit M11. Then, on the basis of a comparison result between the reference aligning torque set by the reference aligning torque setting unit M11 and the aligning torque estimated by the aligning torque estimation unit M6, the grip factor $\epsilon$ for the front wheel(s) is estimated by the grip factor estimation unit M12.

Figure 8:
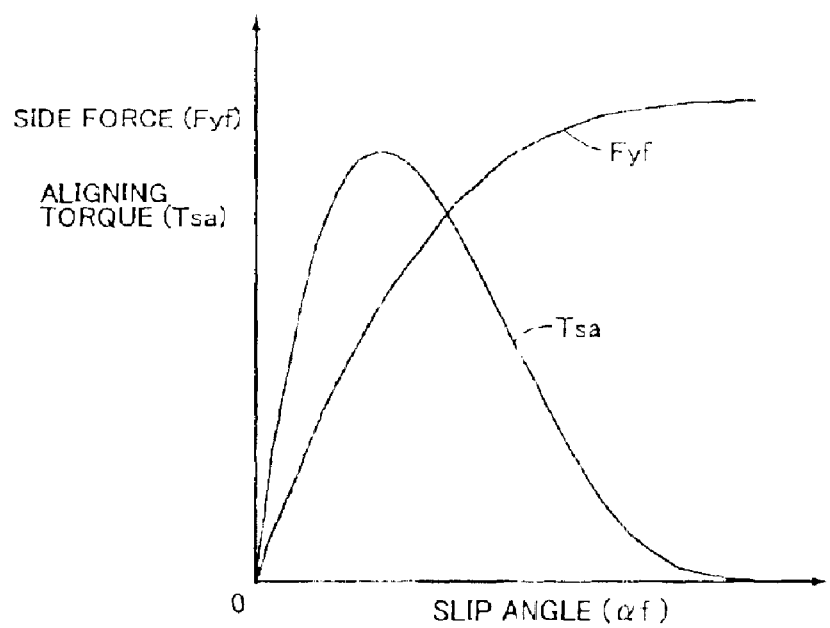
FIG. 8 is a diagram showing a relationship between aligning torque and side force to slip angle according to another embodiment of the present invention.
Figure 9:
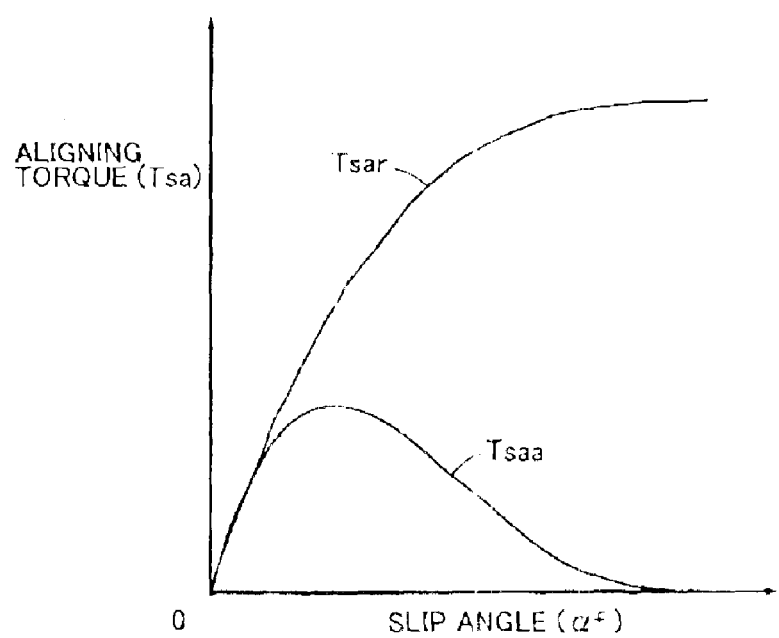
FIG. 9 is a diagram showing a relationship between aligning torque and slip angle according to another embodiment of the present invention.

Referring next to FIGS. 8–12, will be explained the estimation of the grip factor E according to the embodiment as shown in FIG. 7. The relationship of the side force Fyf and aligning torque Tsa to the wheel slip angle, particularly the slip angle $\alpha$f for the front wheel, are those as shown in FIG. 8 wherein they have nonlinear characteristics to the slip angle $\alpha$f, respectively. As the aligning torque Tsa is the product of the front side force Fyf and trail e (=$e_n$+$e_c$), the characteristic of the aligning torque obtained in the case where the wheel (front wheel) is in the gripped state, i.e., the pneumatic trail $e_n$ is in the completely gripped state, indicates a nonlinear characteristic as indicated by "Tsar" in FIG. 9. According to the present embodiment, however, the characteristic of the aligning torque under the completely gripped state is supposed to be linear, and a gradient K2 of the aligning torque Tsa to the slip angle in the vicinity of the origin is obtained, to set a reference aligning torque (indicated by "Tsas" in FIG. 10). If the slip angle is $\alpha$f1, for example, the reference aligning torque can be given by Tsas1=K2·$\alpha$f1. And, the grip factor $\epsilon$ is estimated in accordance with the following equation:

$$\varepsilon = \frac{Tsaal}{Tsasl} = \frac{Tsaal}{K2 \cdot \alpha fl}$$

Figure 10:
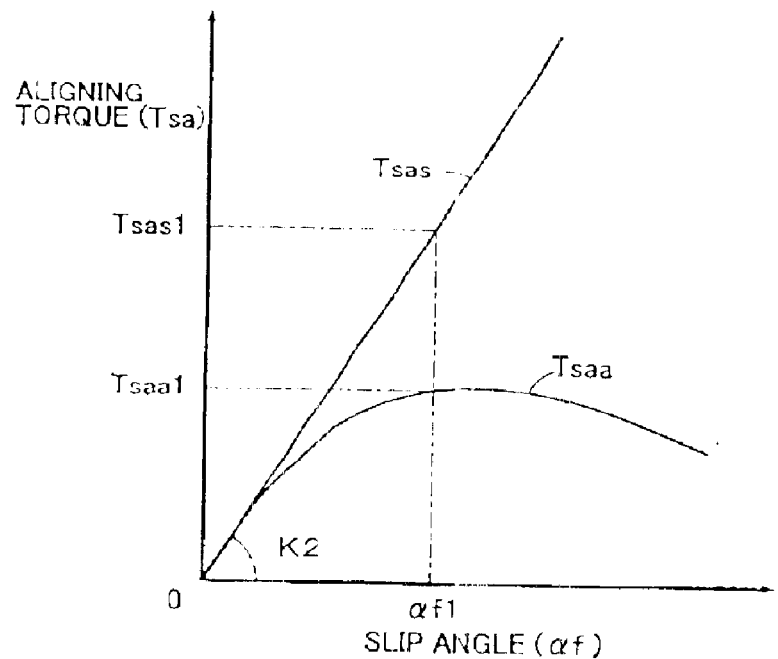
FIG. 10 is a diagram showing a relationship between aligning torque and slip angle according to another embodiment of the present invention.
Figure 11:
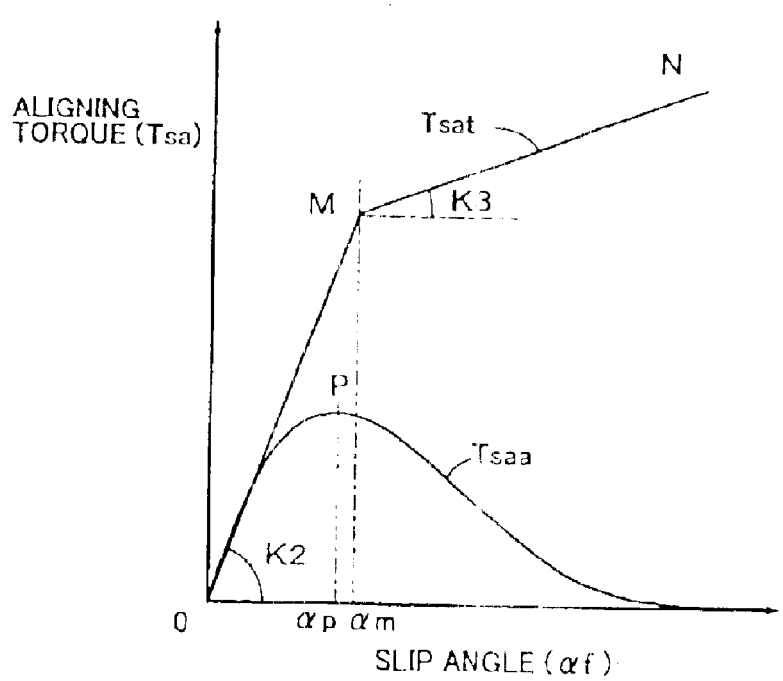
FIG. 11 is a diagram showing a relationship between aligning torque and slip angle according to another embodiment of the present invention.

As the characteristic of the aligning torque has been supposed to be linear, when the reference aligning torque was set in FIG. 10, an error to be caused when the grip factor is estimated will become so large in such an area that the slip angle $\alpha$f is relatively large, that the accuracy in estimating the grip factor might be lessened. In this case, therefore, the gradient of aligning torque may be set to "K3", when the slip angle exceeds a predetermined slip angle, and the nonlinearity of the reference aligning torque may be approximated to a straight line of "OMN" as shown in FIG. 11. In this case, the gradient of aligning torque K3 may be obtained in advance by an experiment, and may be identified and corrected while the vehicle is running In FIG. 10, the point (M) may be set on the basis of the inflection point (P) of the actual aligning torque. For example, after the inflection point (P) is obtained, the point (M) may be set by the slip angle αm which is larger than the slip angle αp corresponding to the inflection point (P) by a predetermined value.

Figure 12:
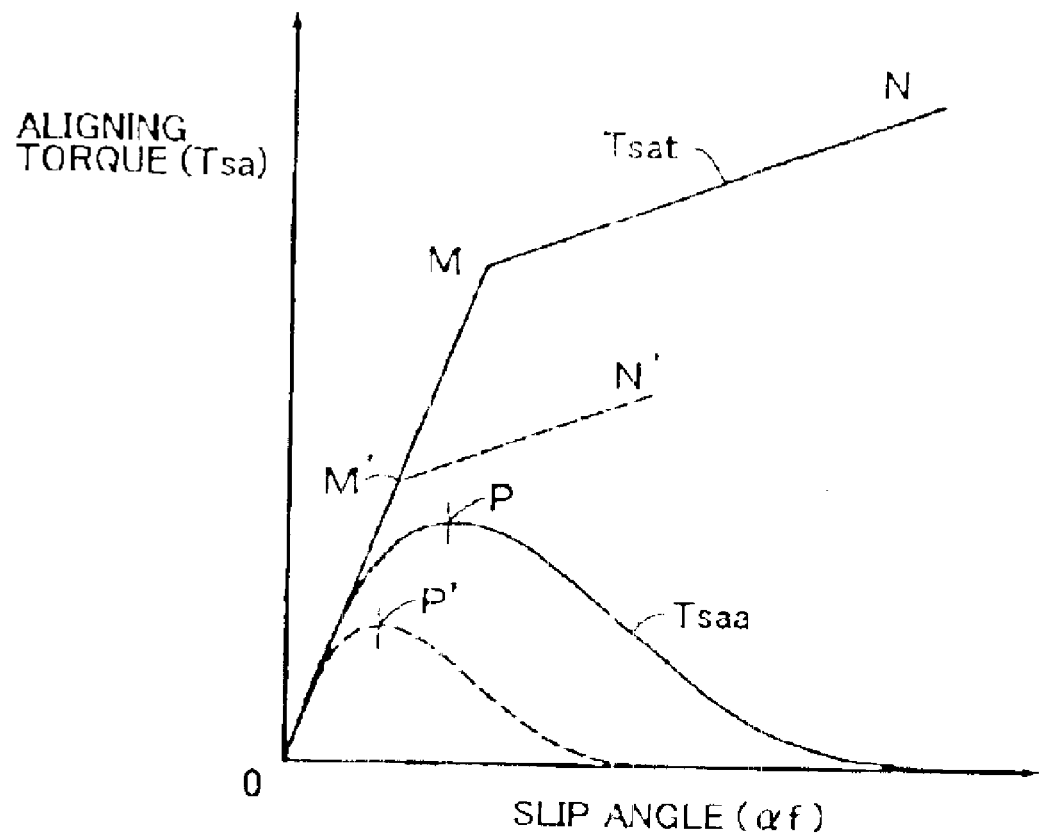
FIG. 12 is a diagram showing a relationship between aligning torque and slip angle according to another embodiment of the present invention.

Furthermore, as the reference aligning torque to the slip angle is affected by the road coefficient of friction $\mu$, the reference aligning torque characteristic may be set at high accuracy by setting the reference aligning torque on the basis of the inflection point (P) of the actual aligning torque Tsaa as shown in FIG. 12. For example, when the road coefficient of friction $\mu$ is reduced, the characteristic of the actual aligning torque Tsaa is changed from a rigid line to a broken line as shown in FIG. 12. In other words, if the road coefficient of friction $\mu$ is reduced, the inflection point of the actual aligning torque Tsaa is changed from the point (P) to a point (P'). Therefore, the reference aligning torque characteristic (Tsat) is required to change "OMN" to "OM'N'". In this case, the point (M') is set on the basis of the inflection point (P'), even if the road coefficient of friction $\mu$ is changed, the reference aligning torque characteristic can be set in accordance with the change of the road coefficient of friction $\mu$.

In the embodiments as described above, the grip factor $\epsilon$ was obtained on the basis of the aligning torque, in view of variation of the pneumatic trail of tire. Whereas, on the basis of a margin of side force for road friction, a grip factor indicative of a grip level of the tire in its lateral direction can be estimated (in this case "$\epsilon m$" is used herein), as described hereinafter.

According to a theoretical model of a tire, so-called brush model, which is used for analyzing the force produced on the tire, the relationship between the (actual) aligning torque Tsaa to the (front) side force Fyf can be obtained in accordance with the following equations:

$$\text{Provided that } \xi = 1 - \left(\frac{Ks}{3 \cdot \mu \cdot Fz}\right) \cdot \lambda,$$

$$\text{If } \xi > 0, \; Fyf = \mu \cdot Fz \cdot (1 - \xi^3) \quad (1)$$

$$\text{If } \xi \leq 0, \; Fyf = \mu \cdot Fz \quad (2)$$

And, $$\text{If } \xi > 0, \; Tsaa = \left(\frac{1 \cdot Ks}{6}\right) \cdot \lambda \cdot \xi^3 \quad (3)$$

$$\text{If } \xi \leq 0, \; Tsaa = 0 \quad (4)$$

where "Fz" is the vertical load, "l" is the length of the tire surface contacting the road, "Ks" is a constant corresponding to the tread hardness, "$\lambda$" is the side slip ($\lambda = \tan(\alpha f)$), and "$\alpha f$" is the slip angle for front wheel(s).

In general, the slip angle $\alpha f$ is small in the area of $\xi > 0$, the equation of $\lambda = \alpha f$ may be applied. As apparent from the equation (1), the maximal value of the side force is $\mu \cdot Fz$.

Therefore, if a portion of side force according to the road coefficient of friction $\mu$ to the maximal value of side force is indicated by a coefficient of friction utilization ratio $\eta$, then the ratio $\eta$ can be given by $\eta = 1 - \xi^3$. Therefore, $\epsilon m = 1 - \eta$ means a margin for (road) coefficient of friction, so that the grip factor $\epsilon m$ can be given by $\epsilon m = \xi^3$.

As a result, the equation (3) can be rewritten by the following equation:

$$Tsaa = \left(\frac{1 \cdot Ks}{6}\right) \cdot \alpha f \cdot \epsilon m \quad (5)$$

The equation (5) indicates that the aligning torque Tsaa is proportional to the slip angle $\alpha f$ and the grip factor $\epsilon m$. Then, if the characteristic obtained when $\epsilon m = 1$ (the utilization ratio of coefficient of friction is zero, and the margin for coefficient of friction is 1) is used for the reference aligning torque characteristic, the reference aligning torque Tsau is given by the following equation:

$$Tsau = \left(\frac{1 \cdot Ks}{6}\right) \cdot \alpha f \quad (6)$$

Then, the grip factor $\epsilon m$ can be obtained by the equations (5) and (6) as follows:

$$\epsilon m = \frac{Tsaa}{Tsau} \quad (7)$$

In the equation (7), the road coefficient of friction $\mu$ is not included as the parameter. Thus, the grip factor $\epsilon m$ can be calculated without using the road coefficient of friction $\mu$. In this case, the gradient K4 ($= l \cdot Ks/6$) of the reference aligning torque Tsau can be set in advance by means of the brush model, or can be obtained through experiments. Furthermore, if the initial value is set at first, then the gradient of the aligning torque is identified in the vicinity of the origin of the slip angle when the vehicle is running, to correct the initial value, the accuracy of the grip factor will be improved.

Figure 41:
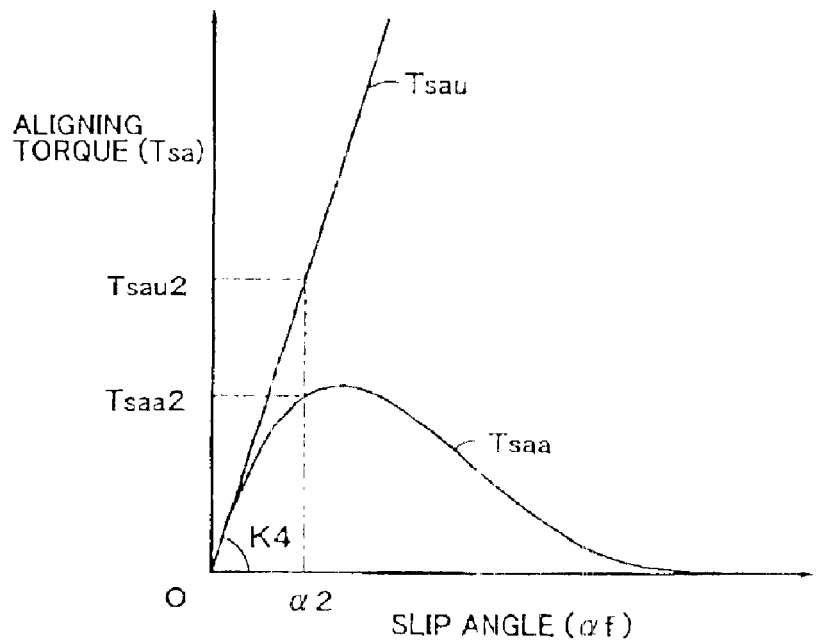
FIG. 41 is a diagram showing a relationship between aligning torque and slip angle according to a further embodiment of the present invention.

As shown in FIG. 41, for example, if the slip angle is $\alpha f2$, the reference aligning torque Tsau2 is given by the following equation:

$$Tsau2 = K4 \cdot \alpha f2$$

And, the grip factor $\epsilon m$ can be obtained by the following equation:

$$\epsilon m = \frac{Tsaa2}{Tsau2} = \frac{Tsaa2}{K4 \cdot \alpha f2}$$

Figure 42:
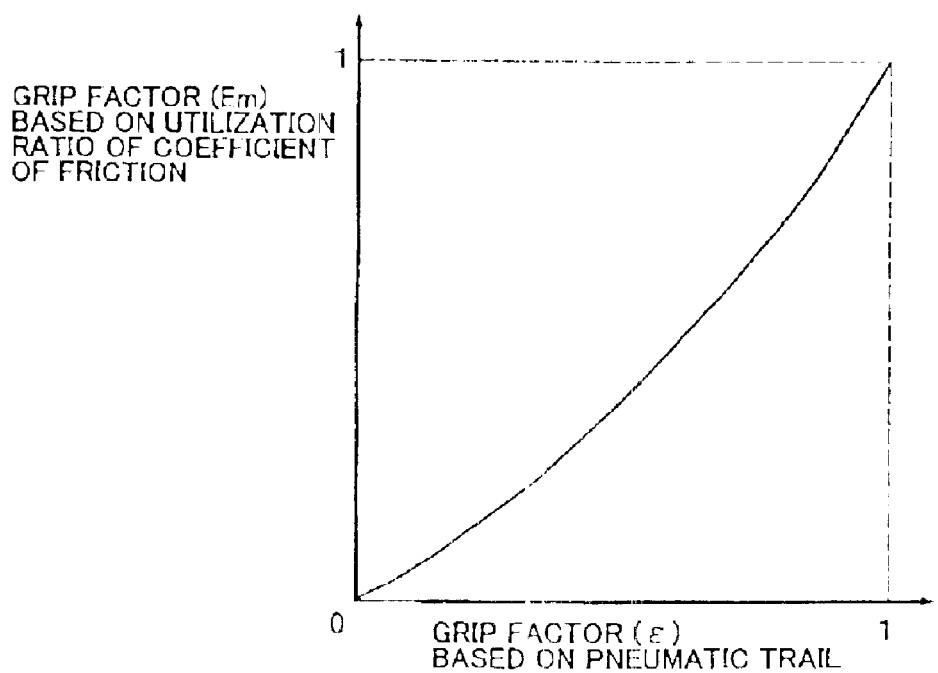
FIG. 42 is a diagram showing a relationship between a grip factor $\epsilon$ based on a pneumatic trail and a grip factor $\epsilon m$ based on a margin of side force for road friction, according to the present invention.

Accordingly, in lieu of the grip factor E based on the pneumatic trail as described in FIGS. 1–11, the grip factor $\epsilon m$ based on the margin of side force for road friction can be employed. The relationship between those grip factors $\epsilon$ and $\epsilon m$ will be the one as shown in FIG. 42. Therefore, after the grip factor $\epsilon$ was obtained, then it may be converted into the grip factor $\epsilon m$. On the contrary, after the grip factor $\epsilon m$ was obtained, then it may be converted into the grip factor $\epsilon$.

FIG. 13 illustrates an embodiment of the vehicle motion control apparatus, wherein the steering system includes the electric power steering system EPS and active front wheel steering system AFS. The electric power steering system EPS has been on the market, wherein the steering torque Tstr applied to the steering shaft 2 with the steering wheel 1 operated by the vehicle driver, is detected by the steering torque sensor TS, and the EPS motor (electric motor) 3 is controlled in response to the detected steering torque Tstr, to steer front wheels FL and FR through the speed reducing gear 4 and rack and pinion 5, so as to assist the steering operation of the vehicle driver.

Figure 18:
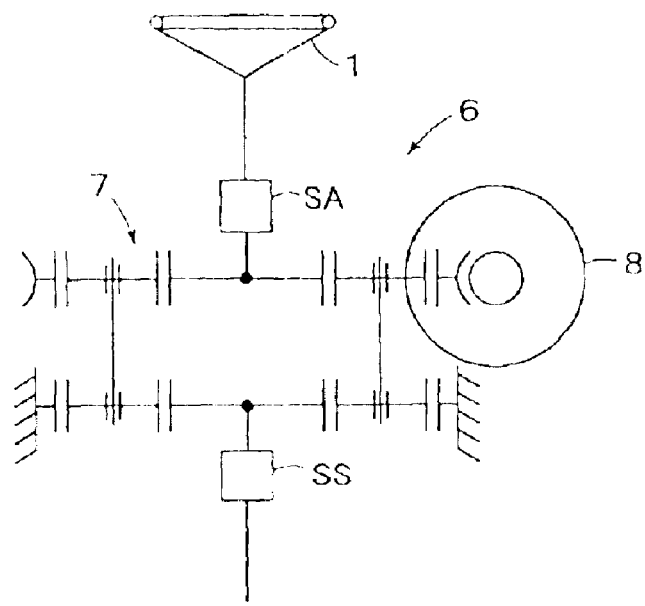
FIG. 18 is a block diagram showing an embodiment of active front wheel steering system according to an embodiment of the present invention.

In the active front wheel steering system AFS, the steered wheel angle can be controlled freely in response to the steering wheel operation of the vehicle driver, by means of an active front wheel steering mechanism 6 provided with planetary gear train 7 and AFS motor (electric motor) 8, as shown in FIG. 18, for example. According to the steering system AFS, therefore, an active steering control for increasing or decreasing the steered wheel angle to the steering operation angle can be achieved by controlling the steering gear ratio of the steering operation angle to the steered wheel angle. The active front wheel steering mechanism 6 as shown in FIG. 18 is merely an example (i.e., not limited thereto), so that may be used any mechanism for performing the active steering control independently of the steering operation of the vehicle driver.

As shown in FIG. 13, according to the present embodiment, an engine EG is an internal combustion engine which is provided with a fuel injection apparatus FI and a throttle control apparatus TH, which is adapted to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and differential gear DF to provide a so-called rear-drive system, but the present embodiment is not limited to the rear-drive system.

Next, with respect to a braking system according to the present embodiment, wheel brake cylinders Wfl, Wfr, Wrl, Wrr are operatively associated with the wheels FL, FR, RL, RR of the vehicle, respectively, and which is fluidly connected to a hydraulic braking pressure control apparatus BC, which will be described later with reference to FIG. 15. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

As shown in FIG. 13, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a stop switch ST which turns on when the brake pedal BP is depressed, and turns off when the brake pedal BP is released, a steering angle sensor SS for detecting a steering angle θh of the front wheels FL and FR, a longitudinal acceleration sensor XG for detecting a vehicle longitudinal acceleration Gx, a lateral acceleration sensor YG for detecting a vehicle lateral acceleration Gy, a yaw rate sensor YS for detecting a yaw rate γ of the vehicle, steering torque sensor TS, rotational angle sensor RS for detecting a rotational (turning) angle of the EPS motor 3, and so on. These are electrically connected to the electronic controller ECU.

FIG. 14 shows an overall system of the present invention, wherein the steering control system EPS, active front wheel steering system AFS, brake control system (ABS, TRC, VSC), throttle control system SLT and warning system are connected with each other through the communication bus, so that each system may hold each information commonly. The steering control system includes a steering control unit ECU1 which is provided with CPU, ROM and RAM for the electric steering control EPS, and to which the steering torque sensor TS and rotational angle sensor RS are connected, and also the EPS motor 3 is connected through a motor drive circuit AC1. The brake control system is adapted to perform the anti-skid control (ABS), traction control (TRC), and vehicle stability control (VSC), and includes a brake control unit ECU2 which is provided with CPU, ROM and RAM for the brake control, and to which the wheel speed sensors WS, hydraulic pressure sensors PS, stop switch ST, yaw rate sensor YS, longitudinal acceleration sensor XG, lateral acceleration sensor YG and steering angle sensor SS are connected, and also solenoid valves SL are connected through a solenoid drive circuit AC2.

The warning system is adapted to output a warning signal when the estimated grip factor is less than a predetermined value, and includes a warning control unit ECU3 which is provided with CPU, ROM and RAM for the warning control, and to which a warning apparatus AC3 for providing the warning information through an indicator or audio system or the like. The active front wheel steering system AFS includes an active steering control unit ECU4 which is provided with CPU, ROM and RAM for the active front wheel steering control, and to which a steering operation angle sensor SA and a rotational angle sensor RS are connected, and the AFS motor 8 is connected through a motor drive circuit AC4. Likewise, the throttle control (SLT) system includes a throttle control unit ECU5 which is provided with CPU, ROM and RAM for the throttle control, and to which a throttle control actuator AC5 is connected. Those control units ECU1–ECU5 are connected to the communication bus through a communication unit provided with CPU, ROM and RAM for the communication, respectively. Accordingly, the information required for each control system can be transmitted by other control systems.

FIG. 15 shows an embodiment of the hydraulic braking pressure control apparatus BC according to the present embodiment, which is called as brake-by-wire, which is practically described in Japanese Patent Laid-open Publication No. 2000-62597, and the operation of which is briefly described hereinafter. In a normal operation, pressure circuits for connecting a master cylinder MC with the wheel brake cylinders Wfl, Wfr, Wrl and Wrr are disconnected. The requirement for braking the vehicle by the driver is detected by the braking amount detection unit including a brake pedal stroke sensor SR, depressing force sensor, master cylinder pressure sensor or the like. And, on the basis of the detected braking amount, a target braking force for each wheel is determined, so that the braking pressure to each wheel is controlled by linear solenoid valves SL1–SL8. In braking operation, solenoid valves SLa, SLb and SLc of ON/OFF type are energized, so that the solenoid valve SLa is placed in its opened position, and the solenoid valves SLb and SLc are placed in their closed positions. Consequently, the master cylinder MC is separated from the wheel brake cylinders Wfl, Wfr, Wrl and Wrr, and communicated with a stroke simulator SM through the solenoid valve SLa. The braking pressure of each wheel is fed with the hydraulic pressure supplied by the high pressure accumulator ACC, and controlled by the linear solenoid valve (e.g., SL1) located at the accumulator side to each wheel and the linear solenoid valve (e.g., SL2) located at the reservoir side to each wheel, so that the braking force is controlled independently of each wheel. The hydraulic pressure circuit as shown in FIG. 15 is merely an example, so that the invention is not limited to it, but any circuit with the automatically pressurizing source may be used.

Figure 16:
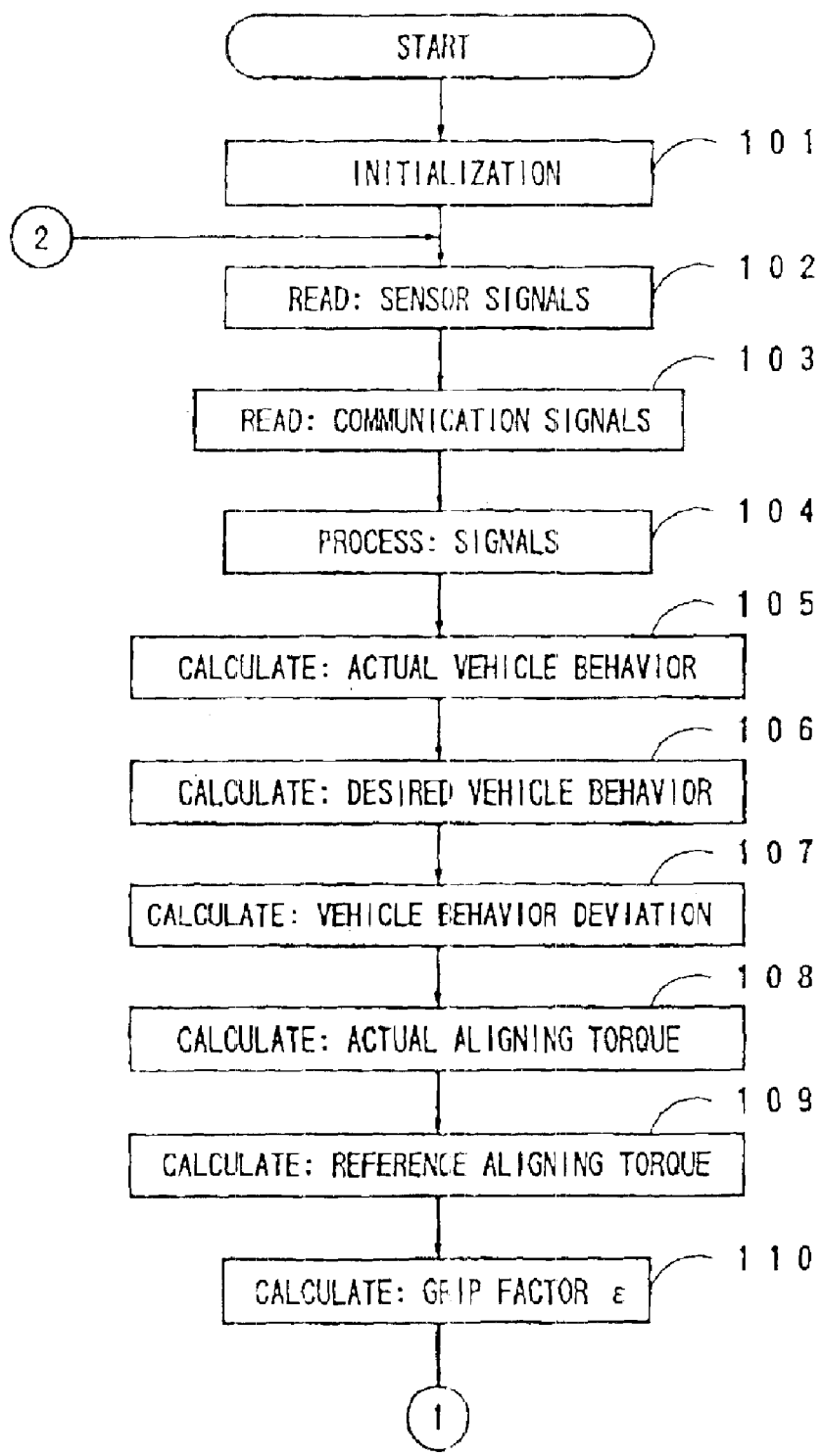
FIG. 16 is a flowchart of grip factor control and vehicle motion control in an embodiment of the present invention.
Figure 17:
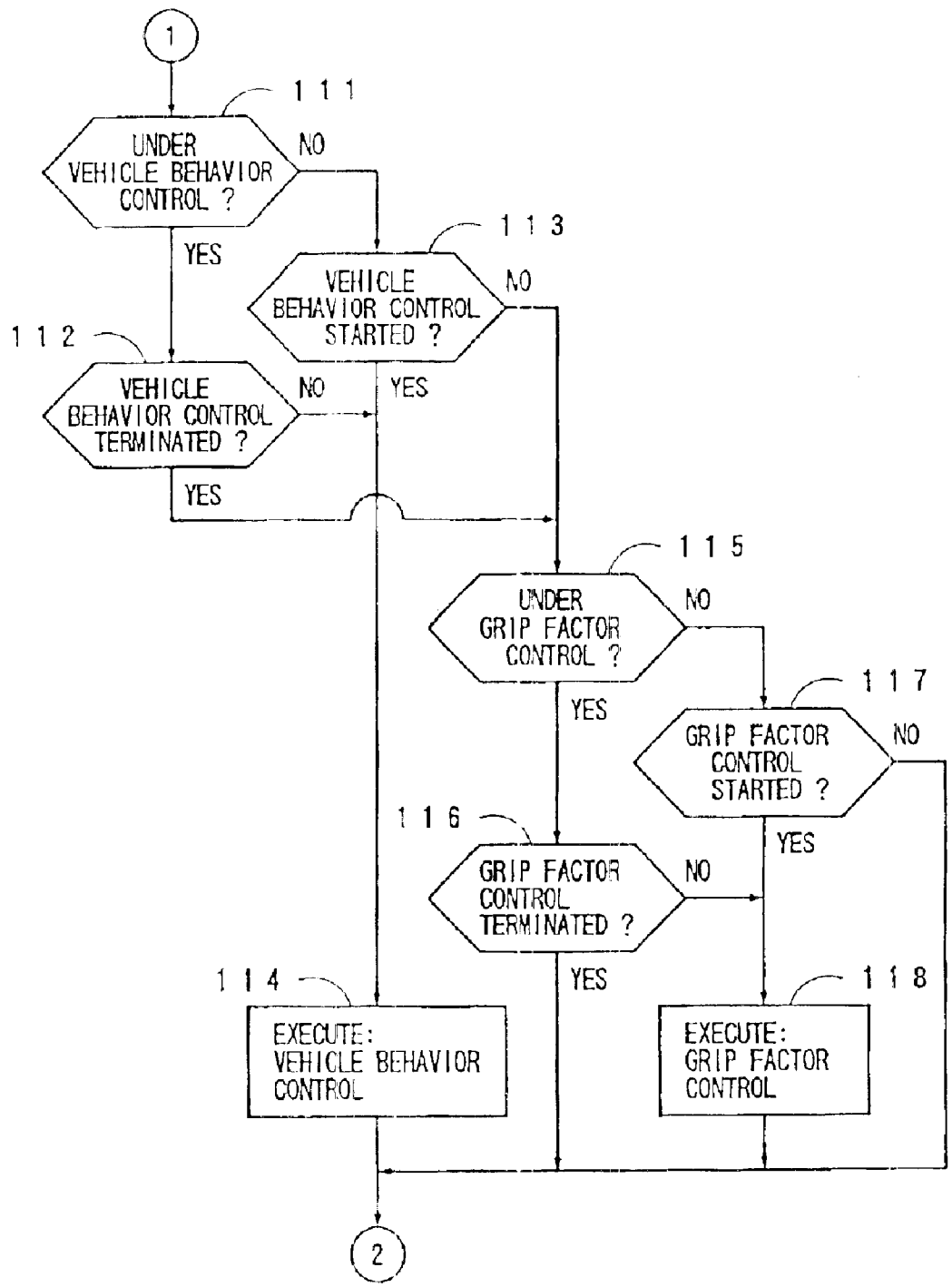
FIG. 17 is a flowchart of grip factor control and vehicle motion control in an embodiment of the present invention.

According to the vehicle motion control apparatus as constituted above, the grip factor control and vehicle behavior control will be performed according to a flow chart as shown in FIGS. 16 and 17. At the outset, the program provides for initialization of the system at Step 101, and the sensor signals and communication signals are read at Steps 102 and 103, respectively. Then, the program proceeds to Step 104 where the signals are processed, and proceeds to Step 105 where the actual vehicle behavior is calculated (operated). In order to calculate the actual vehicle behavior, are used the steered wheel angle, vehicle speed, longitudinal acceleration, lateral acceleration, and yaw rate. And, a desired vehicle behavior to be used for a target is provided on the basis of a vehicle model at Step 106. Then, the desired vehicle behavior is compared with the actual vehicle behavior at Step 107, to obtain a deviation between them. The program further proceeds to Step 108, where the actual aligning torque Tsaa, is estimated on the basis of those signals as explained hereinafter.

In the present embodiment, there is provided the electric power steering apparatus as shown in FIG. 13, wherein the steering torque Tstr applied to the steering shaft 2 according to the steering operation, is detected by the steering torque sensor TS, and the EPS motor 3 is controlled in response to the detected steering torque Tstr, to assist the steering operation of the vehicle driver. In this case, the aligning torque produced on the tire of the front wheel will balance with a torque which is obtained by subtracting a friction component in the steering system from the sum of the steering torque according to the steering operation and the torque output from the electric power steering apparatus. Therefore, the actual aligning torque Tsaa can be obtained in accordance with the following equation:

$$Tsaa=Tstr+Teps-Tfrc$$

where "Tstr" is the torque applied to the steering shaft 2 according to the driver's steering operation, and detected by the steering torque sensor TS. "Teps" is the torque output from the electric power steering apparatus This can be estimated on the basis of the value of electric current for driving the motor, because the value of electric current for driving the EPS motor 3 and the output torque of the motor are related in a certain relationship, i.e., the motor output torque is approximately proportional to the motor electric current. "Tfrc" is the friction component in the steering system, i.e., the torque component resulted from the friction caused in the steering system.

Figure 19:
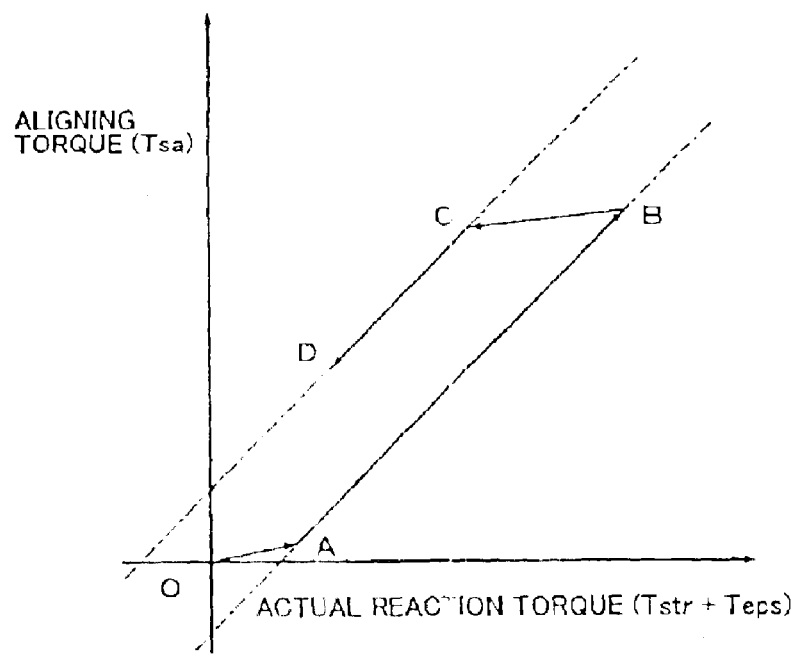
FIG. 19 is a diagram showing a characteristic of friction element in a steering system used for correction to estimate an aligning torque according to an embodiment of the present invention.

According to the present embodiment, therefore, the friction component Tfrc is subtracted from the sum of (Tstr+Teps), to be corrected as will be explained with reference to FIG. 19, so that the actual aligning torque Tsaa is obtained. When the vehicle is running along a straight lane, the actual reaction torque (Tstr+Teps) is zero. When the driver starts the steering operation to begin turning the steering wheel, the actual reaction torque will be produced. First, the torque for compensating the Coulomb's friction will be produced, then the front wheels FL and FR (tires) will be turned to produce the aligning torque. Therefore, in the initial period for changing from the state where the vehicle is running along the straight lane to the state where the steering operation has started, the aligning torque has not been produced yet, with the actual reaction torque increased, as indicated by 0-A in FIG. 19. As a result, the estimated aligning torque will be output as the actual aligning torque Tsaa (this is in fact the estimated value with the correction made, but the word of "estimated" is omitted herein), with a slight gradient to the actual reaction torque. With the steering wheel turned (or rotated) further, if the actual reaction torque exceeds the friction torque area, the actual aligning torque Tsaa will be output along A–B in FIG. 19. If the steering wheel is returned toward its original position, so that the actual reaction torque is reduced, then the actual aligning torque Tsaa will be output along B–C in FIG. 19, with a slight gradient to the actual reaction torque. And, if the actual reaction torque exceeds the friction torque area, the actual aligning torque Tsaa will be output along C–D in FIG. 19, in the same manner as the steering wheel is turned further.

Referring back to FIG. 16, the reference aligning torque Tsao is calculated at Step 109, and the grip factor ε is estimated at Step 110, in accordance with the aforementioned process. Then, the program proceeds to Step 111 in FIG. 17, where it is determined whether the vehicle behavior control is being performed (under control), or not. In the case where it is determined at Step 111 that the vehicle behavior control is being performed, and it is determined that the vehicle behavior control is to be continued at Step 112, or in the case where the program proceeds from Step 111 to Step 113, where it is determined that the conditions for beginning the vehicle behavior control have been fulfilled, then, the program proceeds to Step 114 where the vehicle behavior control is executed. On the contrary, in the case where it is determined at Step 113 that the conditions for beginning the vehicle behavior control have not been fulfilled yet, or it is determined at Step 112 that the conditions for terminating the vehicle behavior control have been fulfilled, so that the vehicle behavior control is not to be performed, then, the program proceeds to Step 115 where it is determined whether the grip factor control is being performed (under control), or not.

In the case where it is determined at Step 115 that the grip factor control is being performed, and it is determined that the grip factor control is to be continued at Step 116, or in the case where the program proceeds from Step 115 to Step 117, where it is determined that the conditions for beginning the grip factor control have been fulfilled, then, the program proceeds to Step 118 where the grip factor control is executed. On the contrary, in the case where it is determined at Step 117 that the conditions for beginning the grip factor control have not been fulfilled yet, or it is determined at Step 116 that the conditions for terminating the grip factor control have been fulfilled, so that the grip factor control is not to be performed, then, the program returns to Step 102 in FIG. 16.

Figure 20:
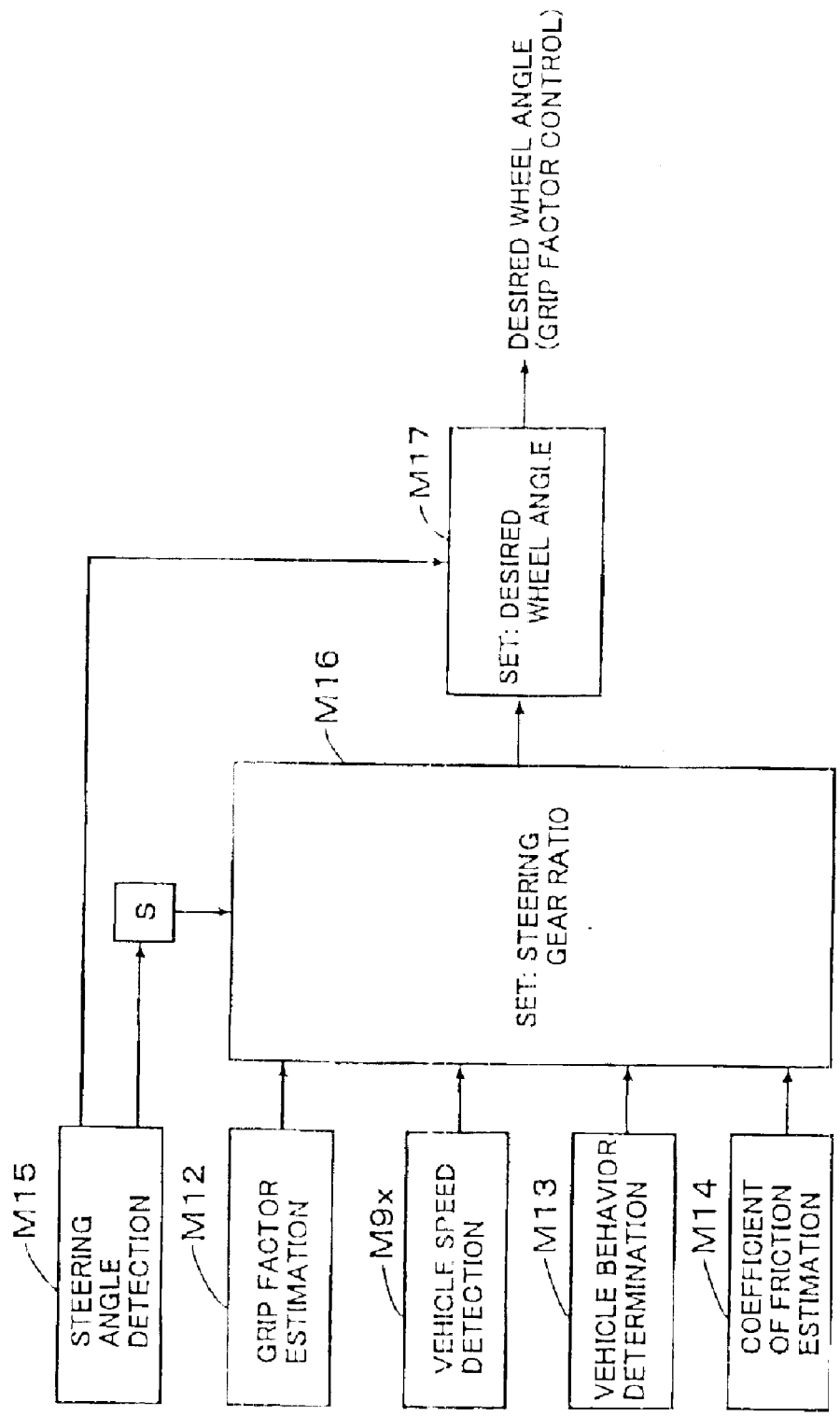
FIG. 20 is a block diagram showing a steering control based on a grip factor according to an embodiment of the present invention.

Referring next to FIG. 20, as an embodiment of the grip factor control, the steering control based on the grip factor will be explained hereinafter. The outputs of the vehicle speed detection unit M9x as shown in FIG. 7 and the grip factor estimation unit M12 as shown in FIGS. 6 and 7 are fed to a steering gear ratio setting unit M16, together with the outputs of a vehicle behavior determination unit M13 and a coefficient of friction estimation unit M14. And, the signal output from a steering angle detection unit M15 is differentiated (s), and the result is fed to a steering gear ratio setting unit M16. According to the coefficient of friction estimation unit M14, the coefficient of friction $\mu$ can be estimated on the basis of at least one of the state variables including a value of the actual aligning torque Tsaa with an inflection point thereof produced, front slip angle αf, side force Fy, lateral acceleration Gy, yaw rate γ, and the like.

Furthermore, as the desired (steered) wheel angle control based upon the grip factor is initiated when the grip factor $\epsilon$ is reduced to a certain level, it is possible to estimate the road coefficient of friction $\mu$ by using the inflection point of the actual aligning torque Tsaa, i.e., the point (P) in FIG. 11.

According to the steering gear ratio setting unit M16, therefore, a ratio of the steering operation angle to the steered wheel angle, i.e., steering gear ratio my be set on the basis of a variation rate (differentiated value) of the steering operation angle (steering handle angle), estimated grip factor, vehicle speed, estimated coefficient of friction, and the result of determination of vehicle behavior, as shown in FIGS. 21–25. Then, a desired value for the steered wheel angle (simply referred to as desired wheel angle) is set by a desired wheel angle setting unit M17, on the basis of the steering gear ratio set by the steering gear ratio setting unit M16, and the differentiated value of the steering operation angle detected by the steering angle detection unit M15, to provide the desired wheel angle control based on the grip factor. That is, the AFS motor 8 as shown in FIG. 18 is controlled to adjust the steered wheel angle to be of the desired value.

As described above, the steering gear ratio is the ratio of the steering operation angle to the steered wheel angle. Therefore, when the steering gear ratio is relatively large, the steered wheel angle is relatively small against the steering operation of the vehicle driver. And, as the object to be controlled in this case is the steering gear ratio, the AFS motor 8 is not actuated while the vehicle driver is holding the steering wheel at a certain position. The direction of the wheel to be steered according to the desired wheel angle control corresponds to the direction steered by the vehicle driver.

Figure 21:
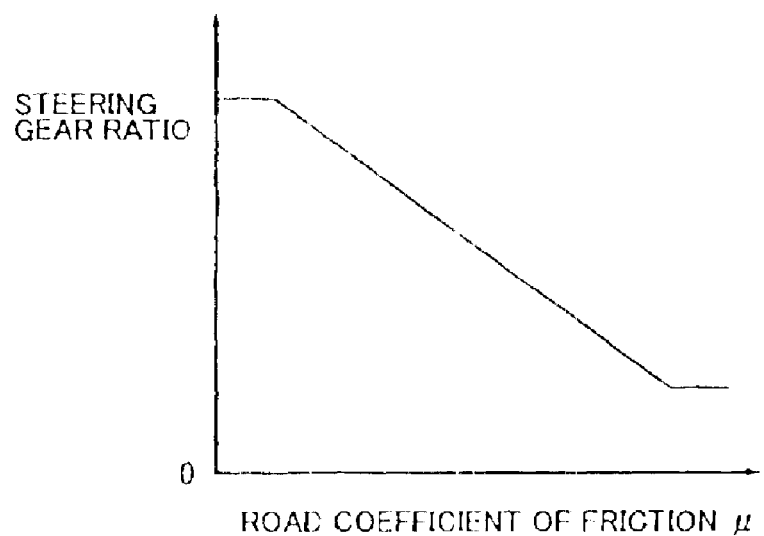
FIG. 21 is a diagram showing a relationship between road coefficient of friction and steering gear ratio in a map for use in an embodiment of the present invention.
Figure 22:
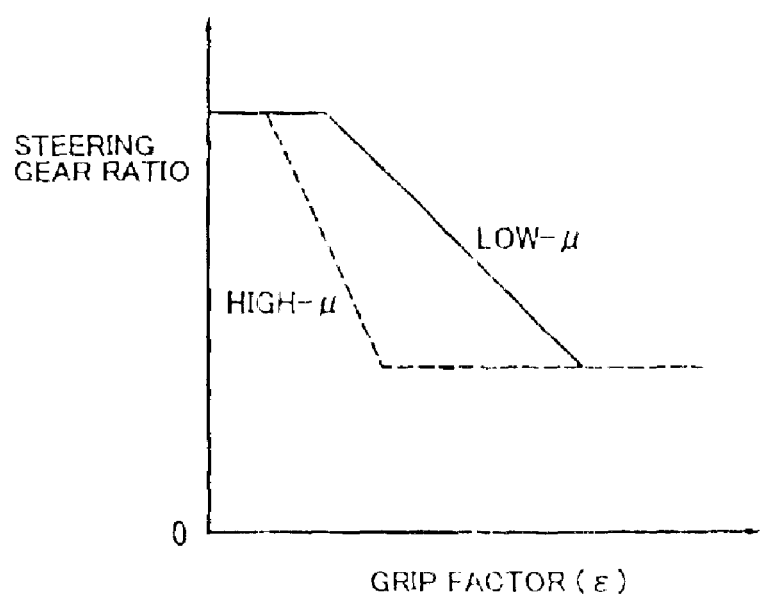
FIG. 22 is a diagram showing a relationship between grip factor and steering gear ratio in a map for use in an embodiment of the present invention.

FIGS. 21–25 are maps provided for setting the steering gear ratio at the steering gear ratio setting unit M16. FIG. 21 indicates a relationship between the road coefficient of friction $\mu$ and the steering gear ratio. In the case where the road coefficient of friction $\mu$ is relatively low, the steering gear ratio is set to be relatively large, so as to prevent the steering wheel from being steered excessively. FIG. 22 indicates a relationship between the grip factor and the steering gear ratio. In the case where the grip factor $\epsilon$ is reduced, the steering gear ratio is set to be relatively large, so as to prevent the steering wheel from being steered excessively.

According to the side force characteristic of the front wheel(s), in the case where the front slip angle is relatively small, the side force increases in proportion to the slip angle of the front wheel(s). When the slip angle increases to a certain level (with the slip area in FIG. 3 increased, the grip factor is reduced), the side force will be saturated. Therefore, when the grip factor is reduced, the side force will not be increased even if the steered wheel angle was increased. Furthermore, when the slip angle of the front wheel(s) is increased, both of the braking force characteristic and driving force characteristic will become worse. In order to restrict the unnecessary increase of the slip angle, when the grip factor is reduced, it is preferable to increase the steering gear ratio. And, in the case where road coefficient of friction $\mu$ is relatively low, the grip factor is reduced suddenly. Therefore, in such a state that there still exists a margin to the grip factor (i.e., the grip factor is high, comparing with that obtained on high-$\mu$ road), the steering gear ratio is getting set to be large, with the varying gradient set to be gradual.

Figure 23:
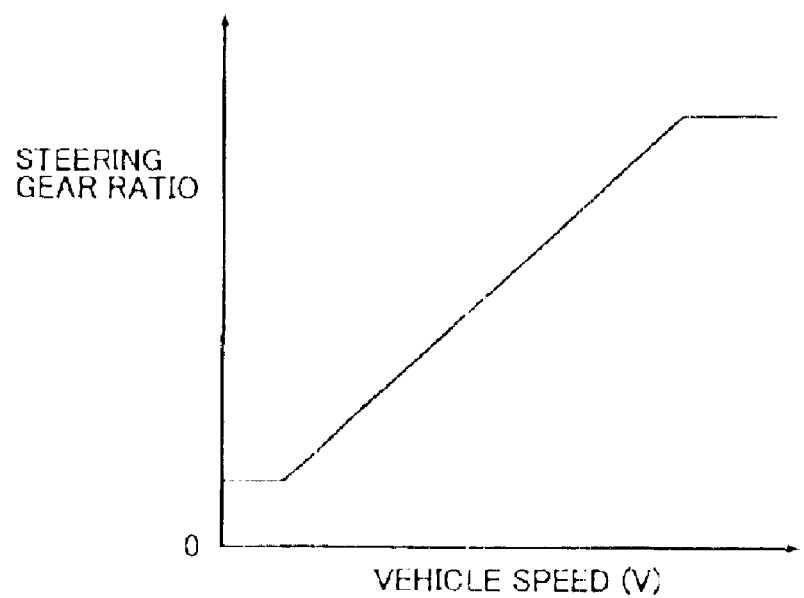
FIG. 23 is a diagram showing a relationship between vehicle speed and steering gear ratio in a-map for use in an embodiment of the present invention.
Figure 24:
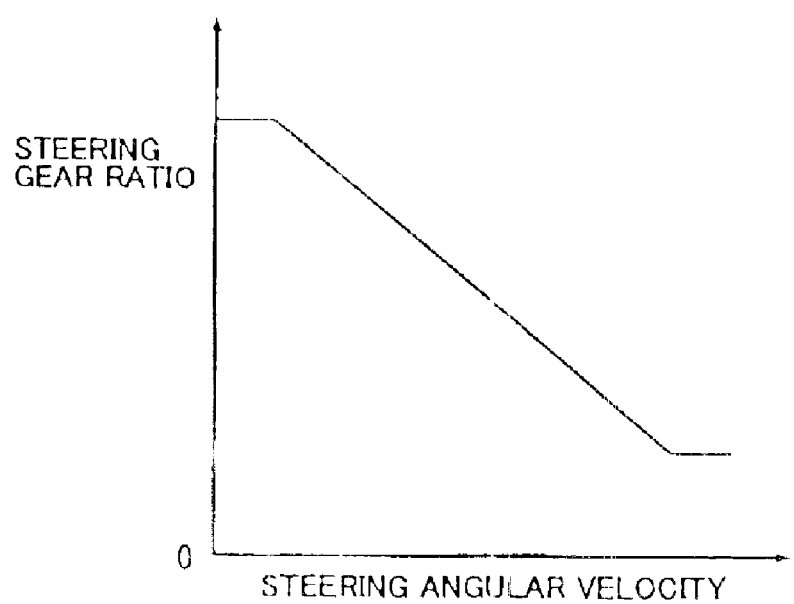
FIG. 24 is a diagram showing a relationship between steering angular velocity and steering gear ratio used for a map according to an embodiment of the present invention.
Figure 25:
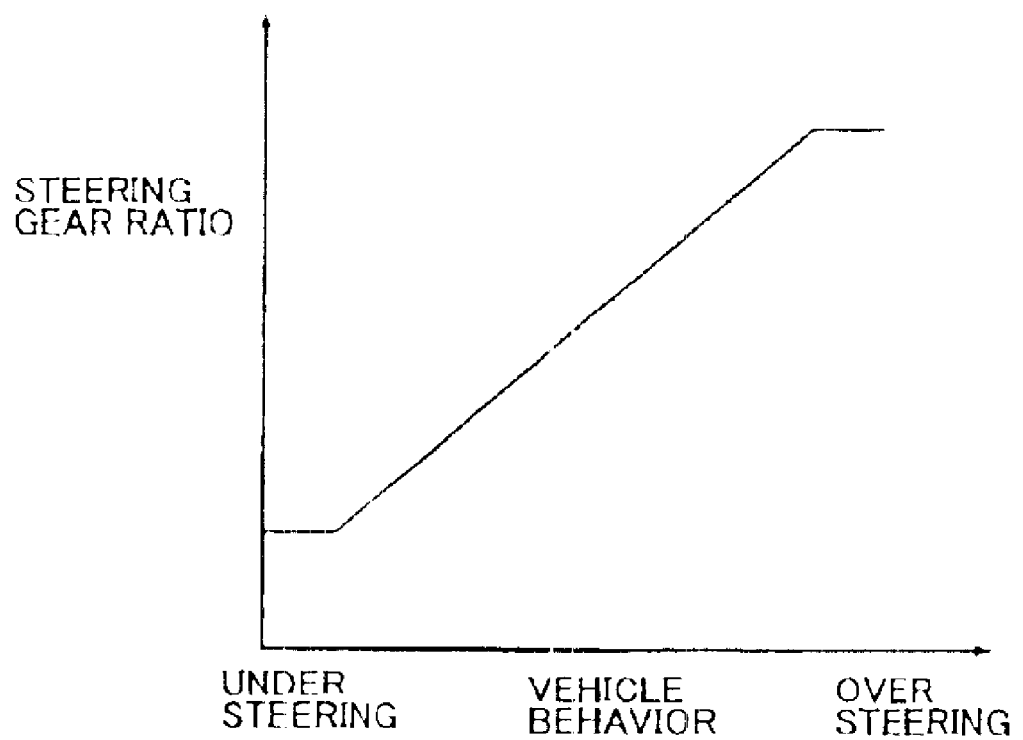
FIG. 25 is a diagram showing a relationship between vehicle behavior and steering gear ratio in a map for use in an embodiment of the present invention.

FIGS. 23 and 24 are maps relating to the vehicle speed and the steering angular velocity. As shown in FIG. 23, when the vehicle speed is relatively high, the steering gear ratio is set to be relatively large. And, as shown in FIG. 24, when the steering operation angular velocity is relatively large, the steering gear ratio is set to be relatively small. FIG. 25 shows a map based on the result of the determination of the vehicle behavior. If it is determined that the vehicle tends to provide the over steering, as the increase of the side force of the front wheel(s) will result in increasing tendency of the over steering, the steering gear ratio is set to be relatively large, so as to restrict the side force from being increased.

Figure 26:
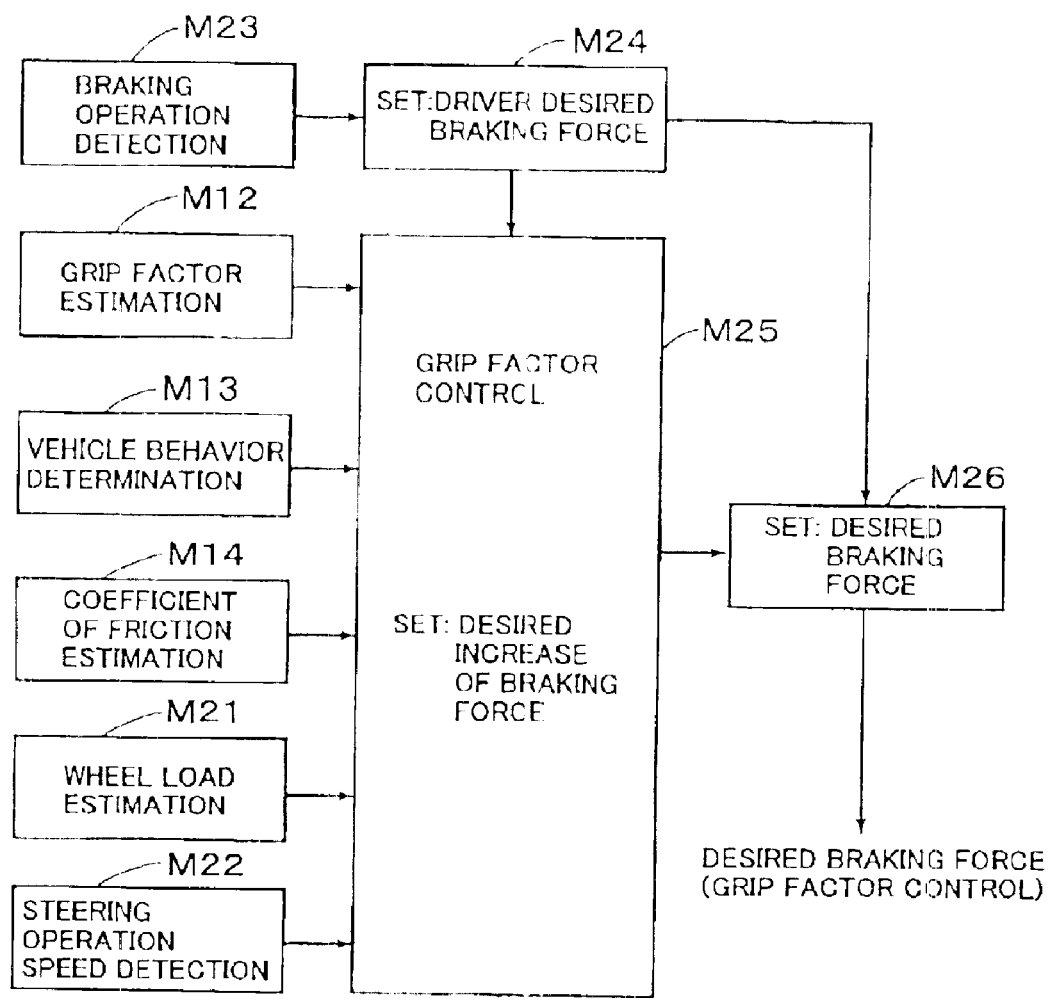
FIG. 26 is a block diagram showing a braking force control based on a grip factor according to an embodiment of the present invention.

FIG. 26 shows a block diagram of another embodiment of the braking force control based upon the grip factor, wherein the increased amount of braking force based upon the grip factor is set on the basis of the amount of braking operation or desired braking force of the vehicle driver, estimated value of the grip factor $\epsilon$, estimated value of the road coefficient of friction, estimated value of the wheel load, result of determination of the vehicle behavior, and steering operation speed of the vehicle driver. The grip factor is estimated by the grip factor estimation unit M12 (the same in FIG. 6), the road coefficient of friction is estimated by the coefficient of friction estimation unit M14, on the basis of the inflection point (point (P) in FIG. 11) of the actual aligning torque. The wheel load is estimated by a wheel load estimation unit M21 as described before (at Step 204), and the vehicle behavior is estimated by the vehicle behavior determination unit M13, as described later. The steering operation speed of the vehicle driver is detected by the steering operation speed detection unit M22. For example, a varying rate of the steering angle signals detected by the steering angle sensor SS as shown in FIG. 13 is calculated. And, the amount of braking operation by the vehicle driver is detected by the braking operation detection unit M23, e.g., stroke sensor SR in FIG. 13.

Furthermore, on the basis of the signal detected by the braking operation detection unit M23, the desired braking force for the vehicle driver is set by a driver desired braking force setting unit M24. On the basis of the results detected or set by the units M12–M14, M21 and M22, the desired increase of braking force is set by a desired increase of braking force unit M25. Then, at a desired braking force setting unit M26, a desired value (or, target value) of braking force for each wheel is determined to add the desired increase of braking force to the desired braking force for the vehicle driver as described above. The braking force control based upon the grip factor may be executed, even when the vehicle driver is not making the braking operation. Therefore, even in the case where the vehicle has run into a curved road at a speed exceeding an ordinary limit for a cornering radius to the road, the vehicle can be held on the curved road maintaining the cornering radius, by controlling the braking force on the basis of the grip factor of the front wheel(s).

Figure 27:
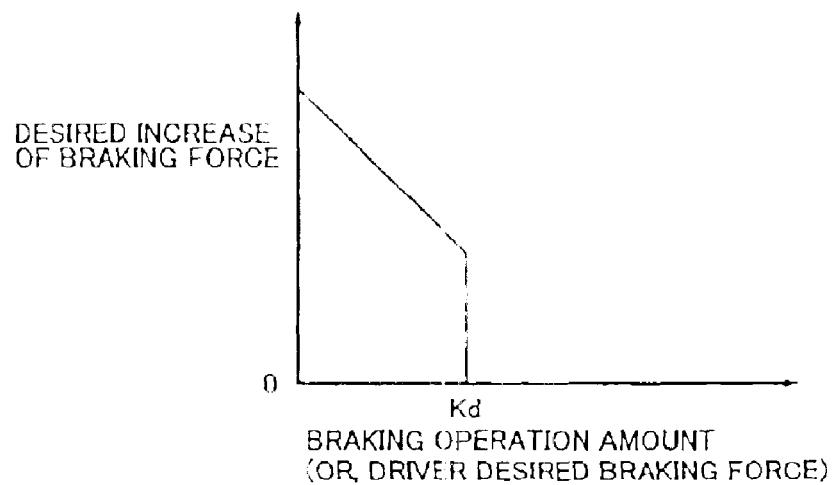
FIG. 27 is a diagram showing a map for a desired increase of braking force to a braking operation of a vehicle driver in an embodiment of the present invention.
Figure 28:
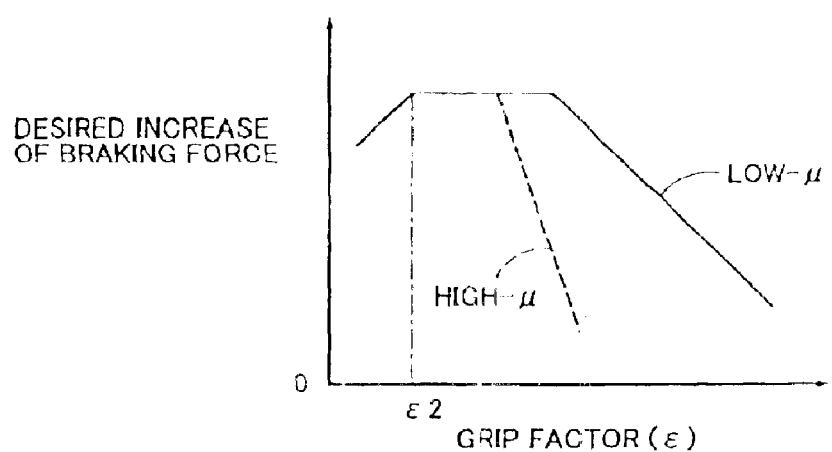
FIG. 28 is a diagram showing a map for a desired increase of braking force to a grip factor according to an embodiment of the present invention.

The desired increase of braking force for use in the braking force control based upon the grip factor is set in accordance with the following conditions. FIG. 27 shows a map of the desired increase of braking force based upon the amount of braking operation or desired braking force of the vehicle driver. When the vehicle driver is making the braking operation more than a predetermined amount (Kd), the braking operation is being made in accordance with a requirement for braking the vehicle, or the grip factor is being reduced by the braking operation. Therefore, the desired increase of braking operation or desired braking force of the vehicle driver is equal to or more than the predetermined amount (Kd), the desired increase of braking force is set to be zero. FIG. 28 shows a map of the desired increase of braking force to the grip factor $\epsilon$, wherein the desired increase of braking force is set to be increased, with the grip factor $\epsilon$ decreased. In this case, if the grip factor $\epsilon$ is decreased too much, the increase of braking force will cause further decrease of the grip factor $\epsilon$. Therefore, the desired increase of braking force is set to be limited, if the grip factor $\epsilon$ is lower than a predetermined grip factor $\epsilon 2$. Also, a threshold level to the grip factor $\epsilon$ for determining the start of braking force control is set to be higher when the road coefficient of friction $\mu$ is relatively low as indicated by a solid line in FIG. 28, than the threshold level which is set when the road coefficient of friction $\mu$ is relatively high as indicated by a broken line in FIG. 28, so that the braking force control shall start from the state with the higher grip factor $\epsilon$. In addition, it is desirable that when the road coefficient of friction $\mu$ is relatively low, the varying rate of desired increase of braking force to the grip factor $\epsilon$ is set to be relatively low, to change the vehicle behavior gradually.

Figure 29:
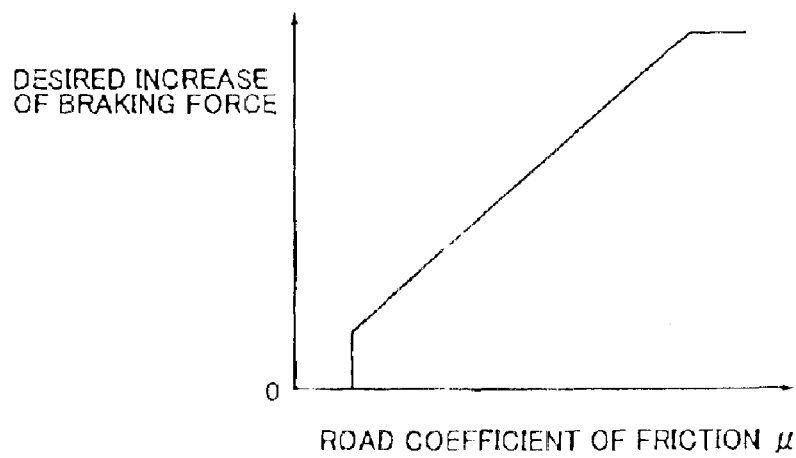
FIG. 29 is a diagram showing a map for a desired increase of braking force to a road coefficient of friction according to an embodiment of the present invention.
Figure 30:
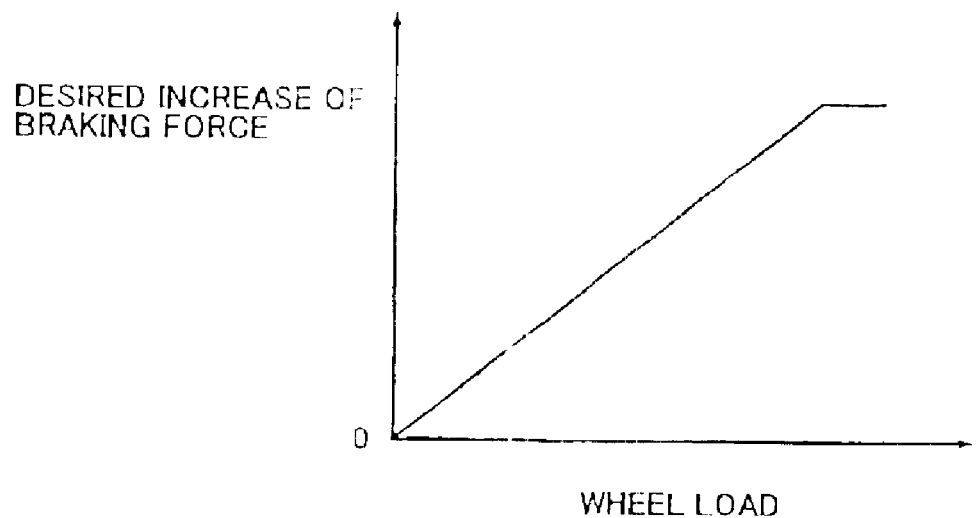
FIG. 30 is a diagram showing a map for a desired increase of braking force to a wheel load according to an embodiment of the present invention.
Figure 31:
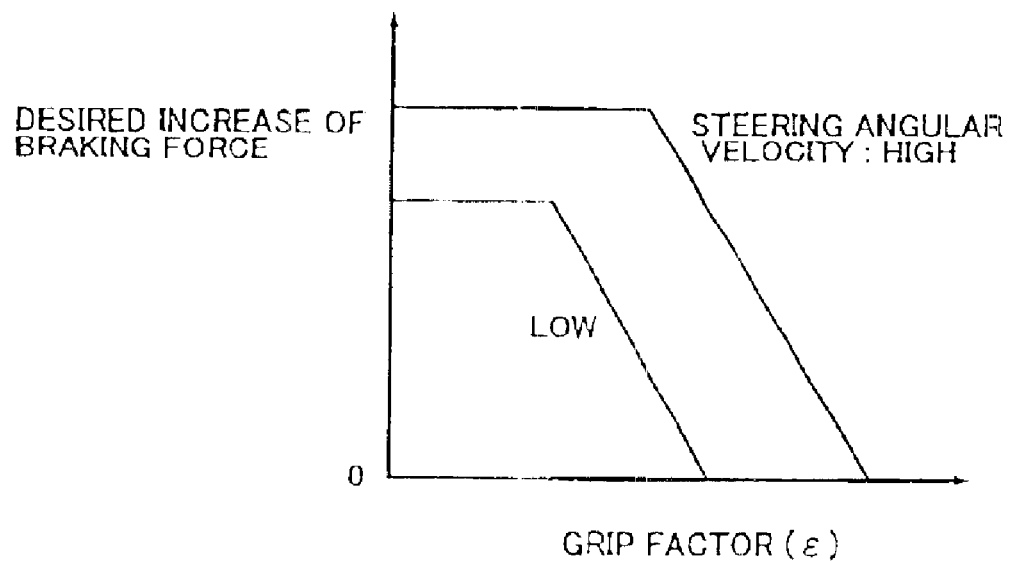
FIG. 31 is a diagram showing a map for a desired increase of braking force on the basis of steering operation speed of a vehicle driver and a grip factor according to an embodiment of the present invention.

FIG. 29 shows a map of the desired increase of braking force to the road coefficient of friction $\mu$, and FIG. 30 shows a map of the desired increase of braking force to the wheel road. As apparent from FIGS. 29 and 30, it has been set that the larger the road coefficient of friction $\mu$ or wheel load is, the larger the desired increase of braking force will be set. Thus, the characteristic of braking force of the wheel depends on the wheel load and road coefficient of friction. In this case, an upper limit has been set for the desired increase of braking force, in order that the braking force control can be made within a predetermined area in the adhesive area, without excessively enlarging the slip area as shown in FIG. 3. Furthermore, FIG. 31 shows a map of the desired increase of braking force set on the basis of the steering operation speed of the vehicle driver and the grip factor. As described before, the steering operation speed of the vehicle driver is detected by calculating the varying rate of the steering angle signals detected by the steering angle sensor SS. In the case where the steering operation speed is high, it is predicted that there should be an emergency such as presence of obstacles ahead of the vehicle. In this case, therefore, the desired increase of braking force is set so that the braking force control shall start from the state with the higher grip factor $\epsilon$, with a relatively large value of the desired increase of braking force itself, to reduce the vehicle speed sufficiently.

With respect to an ordinary vehicle, it has been so designed to provide a characteristic with a slightly under steering, so that the front wheels tend to reach their limits at first. Therefore, when the braking force control is to be made, it is preferable that the braking force control for at least one wheel shall be made to reduce the vehicle speed, with a total side force applied to the wheel for maintaining a yaw moment acting it inward of the cornering curve, and a cornering radius. As an embodiment of the braking force control, the wheel to be braked in accordance with the grip factor may be selected in sequence from the rear wheel located on the inside of the curve, the rear wheel located on the outside of the curve, and the front wheel located on the outside of the curve, and braked together in sequence. Or, all of the rear wheel located on the inside of the curve, the rear wheel located on the outside of the curve, and the front wheel located on the outside of the curve may be controlled simultaneously. If the road surface is of a relatively high coefficient of friction, the braking force control may be applied only to the rear wheels, because the vehicle can be braked effectively to reduce the vehicle speed sufficiently. On the contrary, if the road surface is of extremely low coefficient of friction, it is preferable that the braking force control shall not be applied to the rear wheels, i.e., increase of the braking force shall be prohibited, because the vehicle state may be changed suddenly into such a state that the vehicle tends to provide the over steering characteristic.

Figure 32:
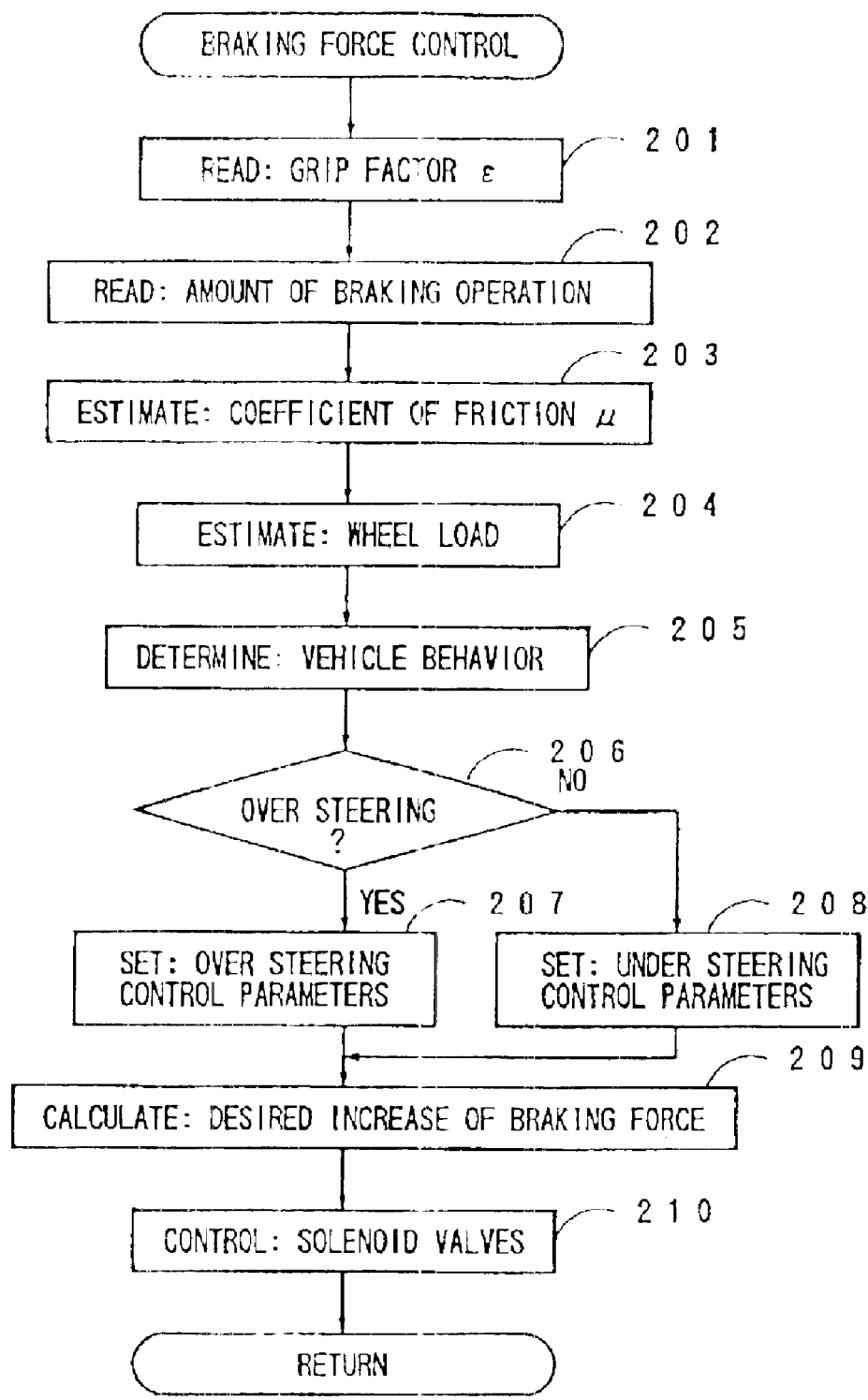
FIG. 32 is a flowchart showing another embodiment of a braking force control according to an embodiment of the present invention.

Although the ordinary vehicle provides the under steering characteristic in its normal state, the vehicle tends to provide the over steering characteristic in case of a transient steering state for slaloming or changing lanes, or change in the coefficient of friction. In this case, the following control will be made, as shown in FIG. 32. At the outset, the grip-factor $\epsilon$ is read at Step 201, and the amount of braking operation of the vehicle driver, i.e., the detected value of the stroke sensor SR in FIG. 15 is read at Step 202. Next, the road coefficient of friction $\mu$ and the vertical load of each (wheel load) are estimated at Steps 203 and 204, respectively. Then, at Step 205, a vehicle behavior determination is made to determine whether the vehicle tends to provide the under steering or over steering. In accordance with a result of the determination, if it is determined at Step 206 that the vehicle is in the over steering state, the program proceeds to Step 207, where over steering control parameters are set for increasing the braking force to produce the yaw moment directed outside of the curve, thereby to reduce the vehicle speed. If it is determined at Step 206 that the vehicle is not in the over steering state, the program proceeds to Step 208, where under steering control parameters are set for maintaining the yaw moment directed inside of the curve and capable of tracing the curve, to reduce the vehicle speed. Accordingly, the desired increase of braking force for each wheel is determined at Step 209 on the basis of the amount of braking operation of the vehicle driver, grip factor $\epsilon$, road coefficient of friction $\mu$, wheel load, and over steering or under steering control parameters as described above. Then, each solenoid valves SL in FIG. 15 are controlled at Step 210 on the basis of the desired braking force added by the desired increase of braking force, to achieve the braking force control.

Figure 33:
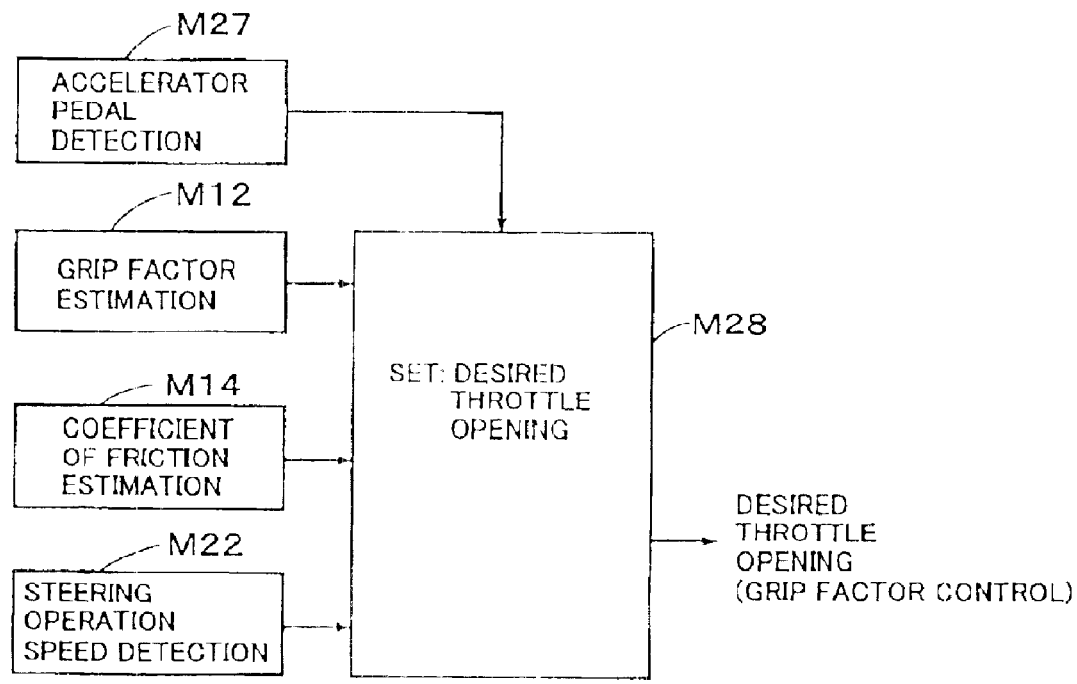
FIG. 33 is a block diagram showing a throttle control on the basis of a grip factor according to an embodiment of the present invention.

FIG. 33 shows a block diagram of a further embodiment of the throttle control based upon the grip factor, wherein the throttle opening is restricted on the basis of the grip factor. The restriction to the throttle opening is set on the basis of the amount of operation of the accelerator pedal by the vehicle driver, estimated value of the grip factor, estimated value of the road coefficient of friction, and steering operation speed of the vehicle driver. The grip factor $\epsilon$ is estimated by the grip factor estimation unit M12 in the same manner as shown in FIG. 26, the road coefficient of friction $\epsilon$ is estimated by the coefficient of friction estimation unit M14, on the basis of the inflection point (point (P) in FIG. 11) of the actual aligning torque. The amount of operation of the accelerator pedal by the vehicle driver is detected by an accelerating amount sensor (not shown), for example, in an accelerator pedal detection unit M27.

Figure 34:
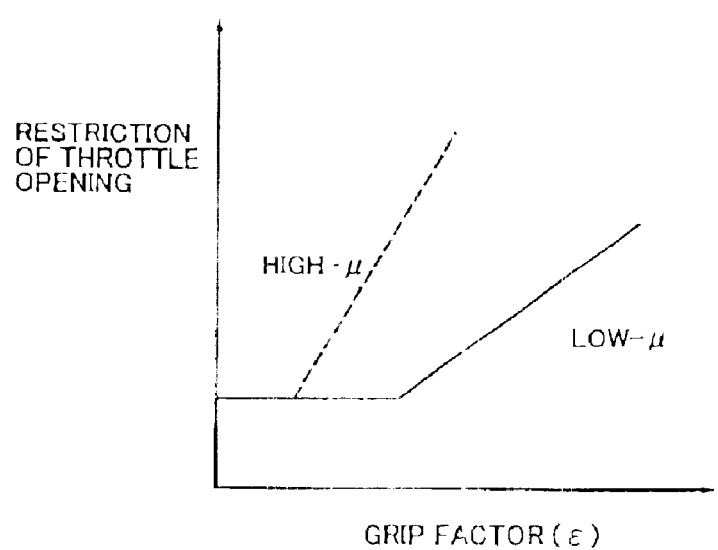
FIG. 34 is a diagram showing a relationship between grip factor and restriction of throttle opening provided for setting a desired throttle opening according to an embodiment of the present invention.

Then, the desired throttle opening is set by a desired throttle opening setting unit M28, on the basis of the output detected by the accelerator pedal detection unit M27, and other outputs from the unit M12 and so on. When the throttle opening provided in response to the accelerator pedal operation of the vehicle driver is equal to or more than the desired throttle opening, the throttle opening is restricted. FIG. 34 is a map showing a relationship between the grip factor and the throttle opening restriction. As shown in FIG. 34, the amount of restriction to the throttle opening is set to be getting lower, with the grip factor $\epsilon$ being reduced. Also, a threshold level to the grip factor $\epsilon$ for determining the start of throttle opening control is set to be higher when the road coefficient of friction $\mu$ is relatively low as indicated by a solid line in FIG. 34, than the threshold level which is set when the road coefficient of friction $\mu$ is relatively high as indicated by a broken line in FIG. 34. In addition, in the case where the road coefficient of friction $\mu$ is relatively low, the amount of restriction to the throttle opening or the varying rate of the throttle opening is set to be getting lower, with the grip factor $\epsilon$ being reduced, to restrict a change of the vehicle behavior caused by engine braking.

Figure 35:
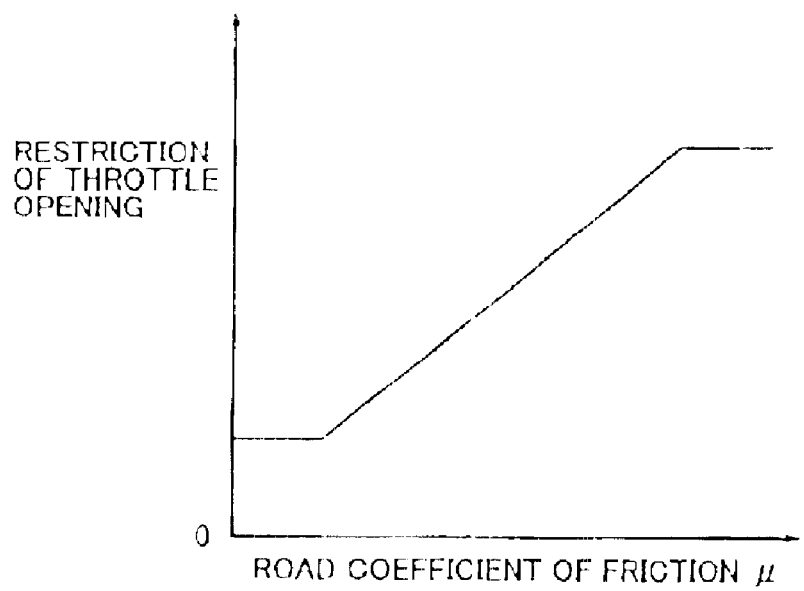
FIG. 35 is a diagram showing a relationship between coefficient of friction and restriction of throttle opening provided for setting a desired throttle opening according to an embodiment of the present invention.
Figure 36:
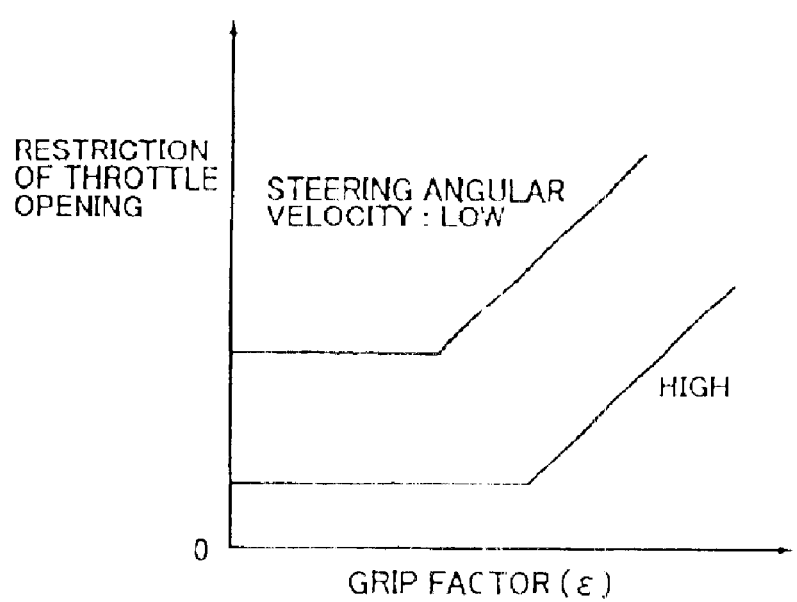
FIG. 36 is a diagram showing a map for steering operation speed provided for setting a desired throttle opening, and restriction of throttle opening on the basis of a grip factor in an embodiment of the present invention.

FIG. 35 shows a map of the throttle opening restriction to the road coefficient of friction, wherein the lower the road coefficient of friction $\mu$ is, the lower the throttle opening restriction will be set. Furthermore, FIG. 36 shows a map of the throttle opening restriction set on the basis of the steering operation speed of the vehicle driver and the grip factor. As described before, the steering operation speed of the vehicle driver is detected by calculating the varying rate of the steering angle signals (i.e., steering operation angular velocity). In the case where the steering operation speed is high, it is predicted that there should be an emergency such as presence of obstacles ahead of the vehicle. In this case, therefore, as shown in FIG. 36, the map is provided so that the throttle control shall start from the state with the higher grip factor, with a relatively large value of the grip factor, and the amount of restriction to the throttle opening is set to be lower.

Figure 37:
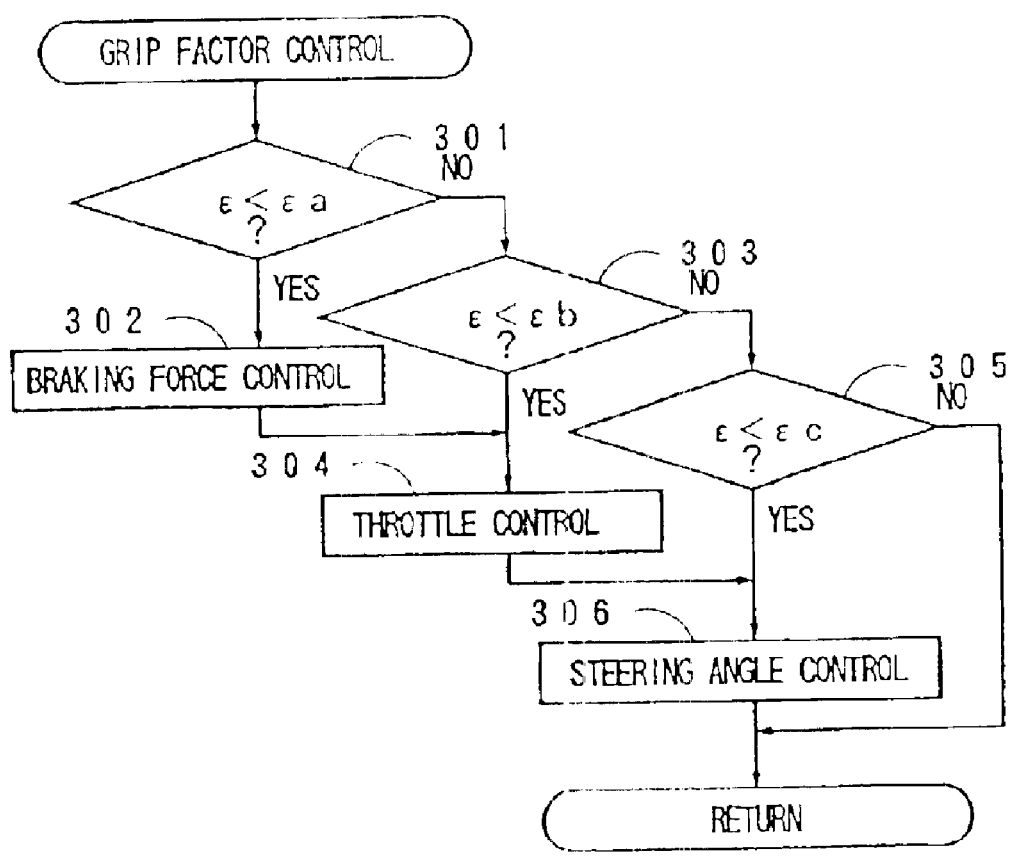
FIG. 37 is a flowchart of a process for setting priority to steering control, braking force control and throttle control in an embodiment of the present invention.

As described above, the grip factor control is executed by the steering control, braking force control, and throttle control based on the grip factor, respectively, on the basis of the threshold level determined independently of each other, and in accordance with the control performed independently of each other. However, as shown in FIG. 37, priority may be given to the steering control, braking force control and throttle control, in accordance with an order of precedence provided in advance, so that each control shall be performed in sequence. For example, when the grip factor is reduced, at the outset, the steering control based on the grip factor is executed, because that control will cause the least strange feeling which might be given to the vehicle driver. Next, the throttle control may be executed, then, the braking force control may be executed. In FIG. 37, the grip factor $\epsilon$ is compared with a predetermined value $\epsilon a$ at Step 301. If it is determined that the grip factor $\epsilon$ is equal to or more than the predetermined value $\epsilon a$, the program proceeds to Step 303 where the grip factor $\epsilon$ is compared with another predetermined value $\epsilon b$ ($>\epsilon a$). If it is determined that the grip factor $\epsilon$ is equal to or more than the predetermined value $\epsilon b$, the program proceeds to Step 305 where the grip factor $\epsilon$ is compared with a further predetermined value $\epsilon c$ ($>\epsilon b$). If it is determined that the grip factor $\epsilon$ is equal to or more than the predetermined value $\epsilon c$, the program returns to the main routine, whereas if it is determined that the grip factor $\epsilon$ is equal to or more than the predetermined value $\epsilon b$ and the grip factor $\epsilon$ is less than the predetermined value $\epsilon c$, the program proceeds to Step 306, where the steering control based on the grip factor will be executed. If it is determined that the grip factor $\epsilon$ is equal to or more than the predetermined value $\epsilon a$ and less than the predetermined value $\epsilon b$, the program proceeds to Step 304, where the throttle control based on the grip factor will be executed. And, if it is determined that the grip factor $\epsilon$ is less than the predetermined value $\epsilon a$, the program proceeds to Step 302, where the braking force control based on the grip factor will be executed. The throttle control and braking force control may be executed simultaneously, because both are provided for controlling the longitudinal motion (back and forth) of the vehicle.

In the case where the vehicle stability could not be maintained even if the grip factor control as described above was executed, the vehicle behavior control is performed. According to the vehicle behavior control, the desired vehicle behavior is set on the basis of the steering operation amount, brake pedal operation amount and accelerator pedal operation amount, which are indicative of the amount of operation of the vehicle driver, and the steered wheel angle, vehicle speed, and road coefficient of friction. Then, the actual vehicle behavior is compared with the desired vehicle behavior, and at least one of the following controls is performed on the basis of the deviation between them. With respect to the vehicle state variable, at least one of the vehicle slip angle, vehicle slip angular velocity, yaw rate and lateral acceleration is to be used herein, and preferably, more than two state variables may be combined.

Next will be explained the steering control based on the vehicle behavior, referring to FIG. 38, as an embodiment of the vehicle behavior control. The steering control based on the vehicle behavior is performed independently of the operation of the steering wheel by the vehicle driver, in contrast to the grip factor control. As described before, according to the steering control based on the grip factor, the direction of the steered wheel angle corresponds to the direction of the steering wheel operated by the vehicle driver, and the steered wheel angle is held as long as the steering wheel is held (during a period of holding the steering wheel). According to the steering control based on the vehicle behavior, however, the steered wheel angle is controlled when it is required, even if the steering wheel was being held, and the direction of the wheel to be steered does not necessarily correspond to the direction of the steering wheel operated by the vehicle driver.

Figure 38:
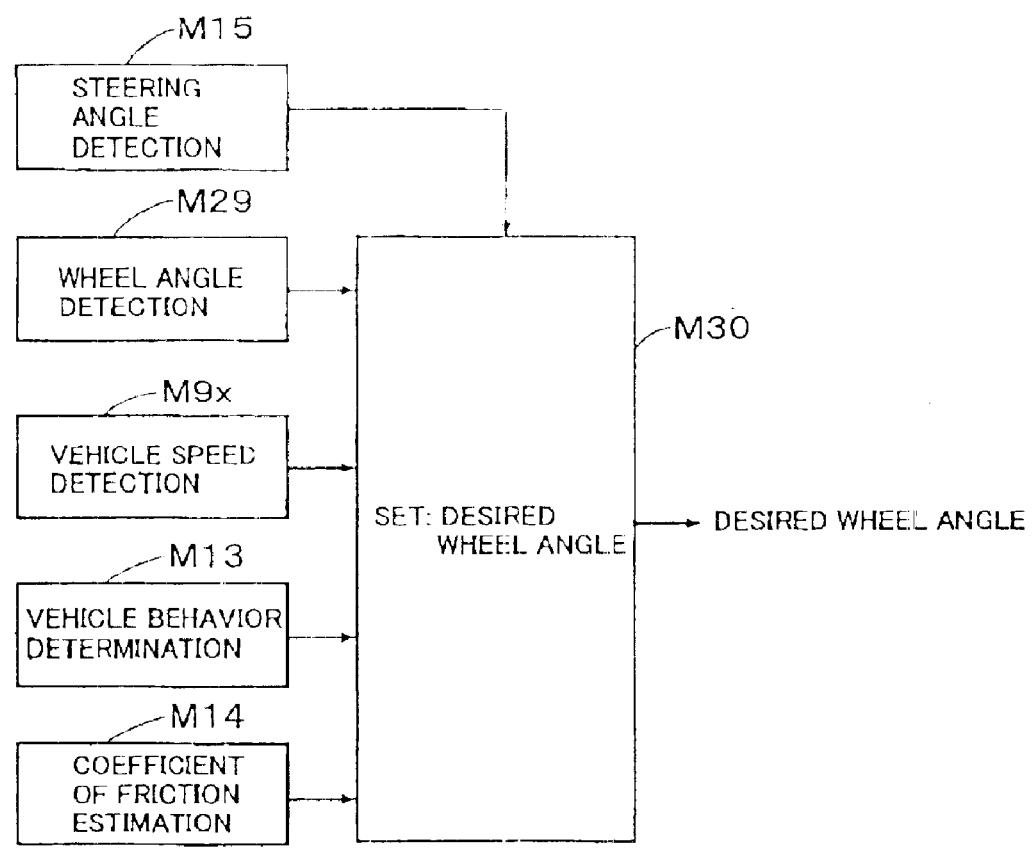
FIG. 38 is a block diagram showing a steering control on the basis of a vehicle behavior according to an embodiment of the present invention.

Referring to FIG. 38, the vehicle behavior is determined by the vehicle behavior determination unit M13, and the coefficient of friction $\mu$ is estimated by the coefficient of friction estimation unit M14. The steering operation angle is detected by the steering angle detection unit M15, and the vehicle speed is detected by the vehicle speed detection unit M9x. Furthermore, the steered wheel angle is detected by a wheel angle detection unit M29. And, the desired value of the steered wheel angle is set by a desired wheel angle setting unit M30, on the basis of the result detected by the wheel angle detection unit M29, the result determined by the vehicle behavior determination unit M13, the result estimated by the coefficient of friction estimation unit M14, and the steering operation angle detected by the steering angle detection unit M15, to provide a desired wheel angle control based on the vehicle behavior. That is, the AFS motor 8 as shown in FIG. 18 is controlled to control the steered wheel angle to be of the desired value.

Figure 39:
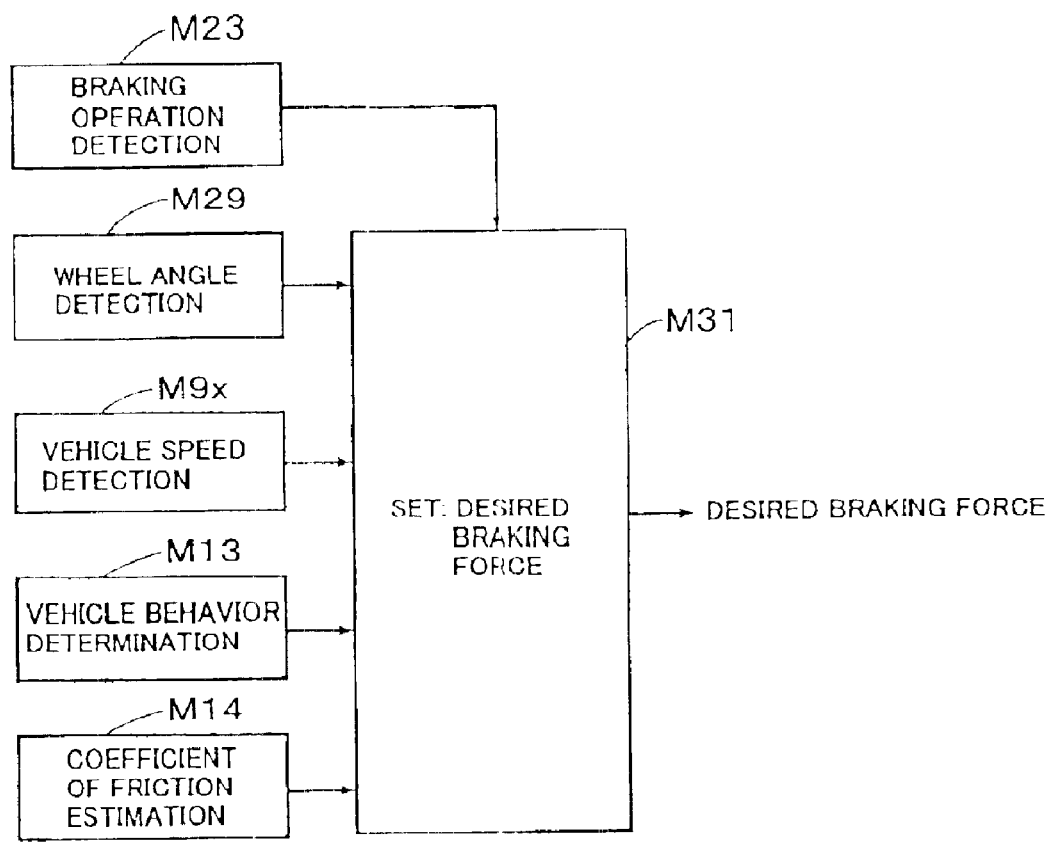
FIG. 39 is a block diagram showing a braking force control on the basis of a vehicle behavior according to an embodiment of the present invention.

FIG. 39 shows the braking force control based on the vehicle behavior, wherein the brake pedal operation amount detected by a braking operation detection unit M23 is used for the amount of braking operation of the vehicle driver, and wherein the desired state variable is set on the basis of the steered wheel angle, vehicle speed and road coefficient of friction, in the same manner as the steering control in FIG. 38. Then, the actual vehicle behavior is compared with the desired vehicle behavior, and the desired braking force is set by a desired braking force setting unit M31 on the basis of the deviation between them, to perform the braking force control. As the braking force control based on the vehicle behavior is executed mainly for the purpose of providing a yaw moment control to maintain a yawing state of the vehicle, the braking force might be added to the braking force produced by the braking force control based on the grip factor, or might be subtracted from the latter braking force.

Figure 40:
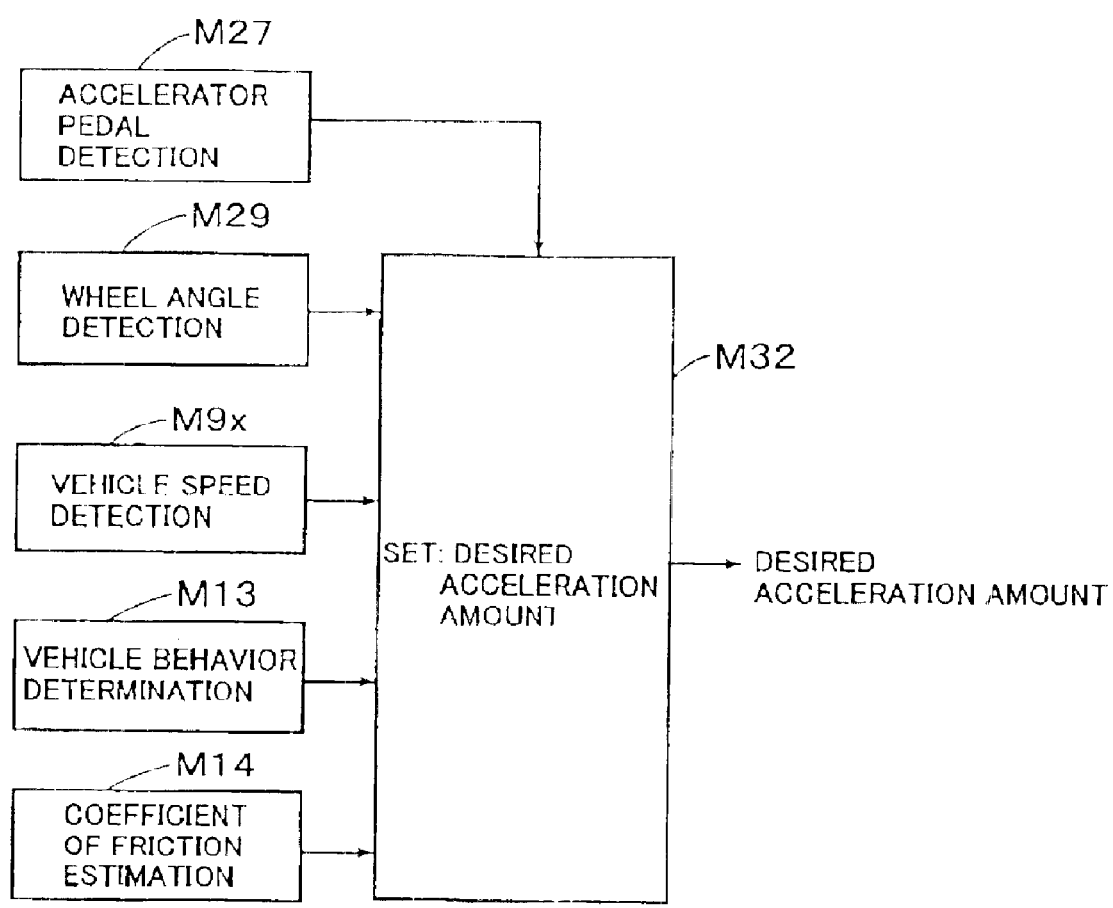
FIG. 40 is a block diagram showing a throttle control on the basis of a vehicle behavior according to an embodiment of the present invention.

FIG. 40 shows the throttle control based on the vehicle behavior, wherein the accelerator pedal operation amount detected by an accelerator operation detection unit M27 is used for the amount of operation of the vehicle driver, and wherein the desired state variable is set on the basis of the steered wheel angle, vehicle speed and road coefficient of friction, in the same manner as the steering control and braking force control based on the vehicle behavior as described above. Then, the actual vehicle behavior is compared with the desired vehicle behavior, and the desired acceleration amount is set by a desired acceleration amount setting unit M32 on the basis of the deviation between them, to perform the throttle control. According to this throttle control based on the vehicle behavior, the allowable opening is provided for the opening of throttle valve, on the basis of the deviation of vehicle state variable. In the case where the throttle opening set on the basis of the accelerator pedal operation operated by the vehicle driver exceeds the allowable opening, the throttle opening will be limited to the allowable opening.

Accordingly, the vehicle can be prevented from being in an unstable state, by means of at least one of the grip factor controls as shown in FIGS. 20, 26 and 33. And, even if the vehicle came to be in the unstable state, the vehicle stability could be maintained, by means of at least one of the vehicle behavior controls as shown in FIGS. 38, 39 and 40.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control apparatus comprising:
    steering factor detection means for detecting at least one of steering factors including a steering torque and steering effort applied to a steering system extending from a steering wheel to a suspension of a vehicle;
    aligning torque estimation means for estimating an aligning torque produced on at least a wheel of said vehicle on the basis of the steering factor detected by said steering factor detection means;
    vehicle state variable detection means for detecting a state variable of said vehicle;
    wheel factor estimation means for estimating at least one of wheel factors including a side force and slip angle applied to said wheel on the basis of the state variable detected by said vehicle state variable detection means;
    grip factor estimation means for estimating a grip factor of at least a tire of said wheel, which grip factor indicates a grip level of the tire in a lateral direction of the wheel, in accordance with a relationship between the aligning torque estimated by said aligning torque estimation means and the wheel factor estimated by said wheel factor estimation means;
    first control means for performing a closed loop control on the basis of the grip factor estimated by said grip factor estimation means; and
    second control means having desired vehicle behavior setting means for setting a desired vehicle behavior on the basis of the state variable detected by said vehicle state variable detection means, and actual vehicle behavior detection means for detecting an actual vehicle behavior of said vehicle, said second control means performing a closed loop control on the basis of a deviation between the actual vehicle behavior detected by said actual vehicle behavior detection means and the desired vehicle behavior set by said desired vehicle behavior setting means.

2. A vehicle motion control apparatus as set forth in claim 1, further comprising priority means for determining first conditions for performing the closed loop control by said first control means and second conditions for performing the closed loop control by said second control means, and giving priority to said second control means when said first conditions and said second conditions have been fulfilled simultaneously.

3. A vehicle motion control apparatus as set forth in claim 1, wherein said first control means is adapted to perform at least one of controls including a steering control for controlling a steering gear ratio of a steering operation angle to a steered wheel angle, a braking force control for increasing a braking force applied to at least one wheel of said vehicle, and a throttle control for restricting a throttle opening of an engine installed on said vehicle.

4. A vehicle motion control apparatus as set forth in claim 3, further comprising priority means for determining first conditions for performing the closed loop control by said first control means and second conditions for performing the closed loop control by said second control means, and giving priority to said second control means when said first conditions and said second conditions have been fulfilled simultaneously.

5. A vehicle motion control apparatus as set forth in claim 1, wherein said first control means is adapted to perform a closed loop steering control on the basis of the grip factor estimated by said grip factor estimation means, and wherein said second control means is adapted to perform a closed loop steering control on the basis of the state variable detected by said vehicle state variable detection means.

6. A vehicle motion control apparatus as set forth in claim 5, wherein said first control means is adapted to control a steering gear ratio of a steering operation angle and a steered wheel angle on the basis of the grip factor estimated by said grip factor estimation means, and wherein said second control means is adapted to control the steered wheel angle independently and irrespective of the steering operation angle.

7. A vehicle motion control apparatus as set forth in claim 1, wherein said first control means is adapted to perform a closed loop braking force control on the basis of the grip factor estimated by said grip factor estimation means, and wherein said second control means is adapted to perform a closed loop braking force control on the basis of the state variable detected by said vehicle state variable detection means.

8. A vehicle motion control apparatus as set forth in claim 7, wherein said first control means is adapted to perform the braking force control on the basis of the grip factor, only by increasing the braking force applied to at least one wheel of said vehicle, and wherein said second control means is adapted to control a yaw moment acting on said vehicle by increasing or decreasing the braking force applied to at least one wheel of said vehicle.

9. A vehicle motion control apparatus as set forth in claim 1, further comprising reference aligning torque setting means for setting a reference aligning torque on the basis of the wheel factor estimated by said wheel factor estimation means and the aligning torque estimated by said aligning torque estimation means, wherein said grip factor estimation means is adapted to estimate the grip factor of said tire on the basis of a result of comparison between the aligning torque estimated by said aligning torque estimation means and the reference aligning torque set by said reference aligning torque setting means.

10. A vehicle motion control apparatus as set forth in claim 9, wherein said reference aligning torque setting means is adapted to set the reference aligning torque by approximating a characteristic of the aligning torque estimated by said aligning torque estimation means against the wheel factor estimated by said wheel factor estimation means to a linear characteristic of the reference aligning torque including at least the origin, and adapted to set the reference aligning torque on the basis of the linear characteristic of the reference aligning torque.

11. A vehicle motion control apparatus as set forth in claim 9, wherein said reference aligning torque setting means is adapted to set a linear characteristic of the reference aligning torque with a gradient which is provided by a brush model of said wheel for estimating the grip factor on the basis of a margin of side force for road friction, and adapted to set the reference aligning torque on the basis of the linear characteristic of the reference aligning torque.

12. A vehicle motion control apparatus comprising:
   steering factor detection means for detecting at least one of steering factors including a steering torque and steering effort applied to a steering system extending from a steering wheel to a suspension of a vehicle;
   aligning torque estimation means for estimating an aligning torque produced on at least a wheel of said vehicle on the basis of the steering factor detected by said steering factor detection means;
   vehicle state variable detection means for detecting a state variable of said vehicle;
   wheel factor estimation means for estimating at least one of wheel factors including a side force and slip angle applied to said wheel on the basis of the state variable detected by said vehicle state variable detection means;
   grip factor estimation means for estimating a grip factor of at least a tire of said wheel, which grip factors indicates a grip level of the tire in a lateral direction of the wheel, in accordance with a relationship between the aligning torque estimated by said aligning torque estimation means and the wheel factor estimated by said factor estimation means; and
   control means for controlling a steering gear ratio of a steering operation angle to a steered wheel angle, and controlling the braking force applied to at least one wheel of said vehicle to reduce a speed of said vehicle, on the basis of the grip factor estimated by said grip factor estimation means, respectively.

13. A vehicle motion control apparatus as set forth in claim 12, further comprising reference aligning torque setting means for setting a reference aligning torque on the basis of the wheel factor estimated by said wheel factor estimation means and the aligning torque estimated by said aligning torque estimation means, wherein said grip factor estimation means is adapted to estimate the grip factor of said tire on the basis of a result of comparison between the aligning torque estimated by said aligning torque estimation means and the reference aligning torque set by said reference aligning torque setting means.

14. A vehicle motion control apparatus as set forth in claim 13, wherein said reference aligning torque setting means is adapted to set the reference aligning torque by approximating a characteristic of the aligning torque estimated by said aligning torque estimation means against the wheel factor estimated by said wheel factor estimation means to a linear characteristic of the reference aligning torque including at least the origin, and adapted to set the reference aligning torque on the basis of the linear characteristic of the reference aligning torque.

15. A vehicle motion control apparatus as set forth in claim 13, wherein said reference aligning torque setting means is adapted to set a linear characteristic of the reference aligning torque with a gradient which is provided by a brush model of said wheel for estimating the grip factor on the basis of a margin of side force for road friction, and adapted to set the reference aligning torque on the on the basis of the linear characteristic of the reference aligning torque.

* * * * *